(12) United States Patent
Oh et al.

(10) Patent No.: US 10,862,633 B2
(45) Date of Patent: *Dec. 8, 2020

(54) TRANSMITTING APPARATUS AND RECEIVING APPARATUS AND CONTROLLING METHOD THEREOF

(71) Applicant: SAMSUNG ELECTRONICS CO., LTD., Suwon-si (KR)

(72) Inventors: Young-ho Oh, Suwon-si (KR); Se-ho Myung, Seoul (KR); Hak-ju Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,827

(22) Filed: May 10, 2019

(65) Prior Publication Data

US 2019/0268111 A1 Aug. 29, 2019

Related U.S. Application Data

(63) Continuation of application No. 15/200,238, filed on Jul. 1, 2016, now Pat. No. 10,291,367.
(Continued)

(30) Foreign Application Priority Data

Feb. 5, 2016 (KR) .................. 10-2016-0014916

(51) Int. Cl.
*H04L 5/00* (2006.01)
*H04L 27/26* (2006.01)

(52) U.S. Cl.
CPC .......... *H04L 5/0007* (2013.01); *H04L 5/0048* (2013.01); *H04L 5/0053* (2013.01);
(Continued)

(58) Field of Classification Search
CPC . H04L 5/0007; H04L 27/2602; H04L 5/0048; H04L 5/0053; H04L 27/2607; H04L 27/2613; H04L 5/0044
See application file for complete search history.

(56) References Cited

U.S. PATENT DOCUMENTS 10,291,367 B2* 5/2019 Oh ................... H04L 27/2607
2010/0157957 A1 6/2010 Yang et al.
(Continued)

FOREIGN PATENT DOCUMENTS

CN 101548518 A 9/2009
CN 102217307 A 10/2011
(Continued)

OTHER PUBLICATIONS

Written Opinion dated Oct. 12, 2016 issued by International Searching Authority in counterpart International Application No. PCT/KR2016/007138 (PCT/ISA/237).
(Continued)

*Primary Examiner* — Walli Z Butt
(74) *Attorney, Agent, or Firm* — Sughrue Mion, PLLC

(57) ABSTRACT

A transmitting apparatus includes: a frame generator configured to generate a frame including a plurality of OFDM symbols; and a signal processor configured to signal-process the generated frame, wherein the plurality of OFDM symbols are included in a bootstrap, a preamble including an L1 basic and an L1 detail, and a payload, and wherein the bootstrap includes information on an FFT size of the OFDM symbols included in the preamble, a length of a guard interval (GI) inserted in the preamble, and a pattern of a preamble pilot inserted in the preamble, and information on an L1 basic mode.

9 Claims, 19 Drawing Sheets

Related U.S. Application Data

(60) Provisional application No. 62/187,428, filed on Jul. 1, 2015.

(52) U.S. Cl.
CPC ...... *H04L 27/2602* (2013.01); *H04L 27/2607* (2013.01); *H04L 27/2613* (2013.01); *H04L 5/0044* (2013.01)

(56) References Cited

U.S. PATENT DOCUMENTS

| | | | |
|---|---|---|---|
| 2012/0216230 A1 | 8/2012 | Vare et al. | |
| 2013/0219431 A1 | 8/2013 | Hong et al. | |
| 2014/0229804 A1 | 8/2014 | Hong et al. | |
| 2016/0373221 A1* | 12/2016 | Michael | H04L 5/0044 |
| 2017/0238315 A1* | 8/2017 | Lee | H04J 11/004 |
| | | | 370/337 |
| 2017/0373894 A1* | 12/2017 | Kim | H04L 27/265 |
| 2018/0139021 A1* | 5/2018 | Atungsiri | H04L 5/0007 |

FOREIGN PATENT DOCUMENTS

| | | |
|---|---|---|
| KR | 10-1999-003844 A | 1/1999 |
| WO | 2008083622 A1 | 7/2008 |
| WO | 2010058891 A1 | 5/2010 |
| WO | 2011/099738 A2 | 8/2011 |

OTHER PUBLICATIONS

International Search Report dated Oct. 12, 2016 issued by International Searching Authority in counterpart International Application No. PCT/KR2016/007138 (PCT/ISA/210).

Communication dated Mar. 2, 2020, from the State Intellectual Property Office of People's Republic of China in counterpart Application No. 201680038635.8.

Communication dated Mar. 18, 2020 by the Indian Patent Office in counterpart Application No. 201817001968.

* cited by examiner

FIG. 9

| Syntax | No. of bits | Format |
|---|---|---|
| bootstrap_symbol_1() { | | |
|     ea_wake_up | 1 | uimsbf |
|     min_time_to_next | 5 | uimsbf |
|     system_bandwidth | 2 | uimsbf |
| } | | |

910

| Syntax | No. of bits | Format |
|---|---|---|
| bootstrap_symbol_2() { | | |
|     bsr_coefficient | 7 | uimsbf |
|     reserved | 1 | bslbf |
| } | | |

920

| Syntax | No. of bits | Format |
|---|---|---|
| bootstrap_symbol_3() { | | |
|     preamble_structure | 8 | uimsbf |
| } | | |

930

TRANSMITTING APPARATUS AND RECEIVING APPARATUS AND CONTROLLING METHOD THEREOF

CROSS-REFERENCE TO THE RELATED APPLICATIONS

This is a continuation of U.S. application Ser. No. 15/200,238 filed Jul. 1, 2016, which claims priority from Korean Patent Application No. 10-2016-0014916, filed on Feb. 5, 2016, in the Korean Intellectual Property Office, and United States Provisional Application No. 62/187,428, filed on Jul. 1, 2015, in the United States Patent and Trademark Office, the disclosures of which are incorporated herein by reference in their entirety.

BACKGROUND

1. Field of the Invention

Apparatuses and methods consistent with the inventive concept relate to a transmitting apparatus, a receiving apparatus, and a controlling method thereof, and more particularly, to a transmitting apparatus configured to map data to at least one signal processing path and to transmit the same, and a receiving apparatus, and a controlling method thereof.

2. Description of the Related Art

In the information-oriented society of the 21st century, broadcasting communication services are entering an era of digitization, multi-channel, broadband, and high quality. In particular, as high-quality digital television (TV), portable multimedia players (PMP), and portable broadcasting apparatuses have been increasingly used in recent years, even in digital broadcasting services, demand for supporting various receiving methods has increased.

In an actual state in which a standard group has established various standards according to demands to provide various services to satisfy user's needs, it is required to find methods for providing better services having improved performance

SUMMARY

Therefore, a purpose of the inventive concept is to resolve the aforementioned problems of conventional technology, that is, to provide a transmitting apparatus configured to provide a bootstrap that includes various information, a receiving apparatus, and a controlling method thereof.

According to an exemplary embodiment of the inventive concept, a transmitting apparatus may include: a frame generator configured to generate a frame including a plurality of OFDM symbols; and a signal processor configured to signal-process the generated frame, wherein the plurality of Orthogonal Frequency-Division Multiplexing (OFDM) symbols are included in a bootstrap, a preamble including an L1 basic and an L1 detail, and a payload, wherein the bootstrap includes information on a Fast Fourier Transform (FFT) size of the OFDM symbols included in the preamble, a length of a guard interval (GI) inserted in the preamble, and a pattern of a preamble pilot inserted in the preamble, and information on an L1 basic mode, wherein a predetermined GI length that is the same or greater than a GI length of a first sub frame of a plurality of sub frames included in the payload or that is the same or greater than a GI length of a sub frame having the greatest GI length among the plurality of sub frames is determined as the length of the GI inserted in the preamble, and wherein the pattern of the preamble pilot is determined as a pattern of a scattered pilot having the greatest scattered pilot density among patterns of the scattered pilot corresponding to the determined length of the GI.

According to another exemplary embodiment of the inventive concept, a receiving apparatus may include: a receiver configured to receive a frame including a plurality of OFDM symbols; and a signal processor configured to signal-process the frame, wherein the plurality of OFDM symbols may be included in a bootstrap, a preamble including an L1 basic and an L1 detail, and a payload, wherein the bootstrap includes information on an FFT size of the OFDM symbols included in the preamble, a length of a GI inserted in the preamble, a pattern of a preamble pilot inserted into the preamble, and information on an L1 basic mode, wherein a predetermined GI length that is the same or greater than a GI length of a first sub frame of a plurality of sub frames included in the payload or that is the same or greater than a GI length of a sub frame having the greatest GI length among the plurality of sub frames is determined as the length of the GI inserted in the preamble, and wherein the pattern of the preamble pilot is determined as a pattern of a scattered pilot having the greatest scattered pilot density among patterns of the scattered pilot corresponding to the determined length of the GI.

According to another exemplary embodiment of the inventive concept, a controlling method of a transmitting apparatus may include: generating a frame including a plurality of OFDM symbols; and signal-processing the generated frame, wherein the plurality of OFDM symbols may be included in a bootstrap, a preamble including an L1 basic and an L1 detail, and a payload, wherein the bootstrap includes information on an FFT size of the OFDM symbols included in the preamble, a length of a GI inserted in the preamble, a pattern of a preamble pilot inserted into the preamble, and information on an L1 basic mode, wherein a predetermined GI length that is the same or greater than a GI length of a first sub frame of a plurality of sub frames included in the payload or that is the same or greater than a GI length of a sub frame having the greatest GI length among the plurality of sub frames is determined as the length of the GI inserted in the preamble, and wherein the pattern of the preamble pilot is determined as a pattern of a scattered pilot having the greatest scattered pilot density among patterns of the scattered pilot corresponding to the determined length of the GI.

According to another embodiment of the inventive concept, a controlling method of a receiving apparatus may include generating a frame including a plurality of OFDM symbols; and signal-processing the generated frame, wherein the plurality of OFDM symbols may be included in a bootstrap, a preamble including an L1 basic and an L1 detail, and a payload, wherein the bootstrap includes information on an FFT size of the OFDM symbols included in the preamble, a length of a GI inserted in the preamble, a pattern of a preamble pilot inserted into the preamble, and information on an L1 basic mode, wherein a predetermined GI length that is the same or greater than a GI length of a first sub frame of a plurality of sub frames included in the payload or that is the same or greater than a GI length of a sub frame having the greatest GI length among the plurality of sub frames is determined as the length of the GI inserted in the preamble, and wherein the pattern of the preamble pilot is determined as a pattern of a scattered pilot having the greatest scattered pilot density among patterns of the scattered pilot corresponding to the determined length of the GI.

According to the aforementioned various embodiments of the inventive concept, the bootstrap includes various information on the preamble.

BRIEF DESCRIPTION OF THE DRAWINGS

The above and/or other aspects of the present invention will be more apparent by describing certain embodiments of the inventive concept with reference to the accompanying drawings, in which:

FIG. 9 is a view illustrating a signaling field of the bootstrap according to an exemplary embodiment;

DESCRIPTION OF THE EXEMPLARY EMBODIMENTS

Hereinafter, various exemplary embodiments of the inventive concept will be described in detail with reference to the accompanying drawings.

An apparatus and a method proposed in the exemplary embodiments can be, of course, applied to various communication systems including mobile broadcasting services including a digital multimedia broadcasting (DMB) service, digital video broadcasting handheld (DVB-H), an advanced television systems committee mobile/handheld (ATSC-M/H) service, an Internet protocol television (IPTV), and the like, communication systems including a moving picture experts group (MPEG) media transport (MMT) system, an evolved packet system (EPS), a long-terms evolution (LTE) mobile communication system, a long-term evolution-advanced (LTE-A) mobile communication system, a high speed downlink packet access (HDSPA) mobile communication system, a high speed uplink packet access (HSUPA) mobile communication system, a 3rd generation project partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, an Institute of Electrical and Electronics Engineers (IEEE) 802.16m communication system, a mobile Internet protocol (Mobile IP) system, and the like.

Figure 1:
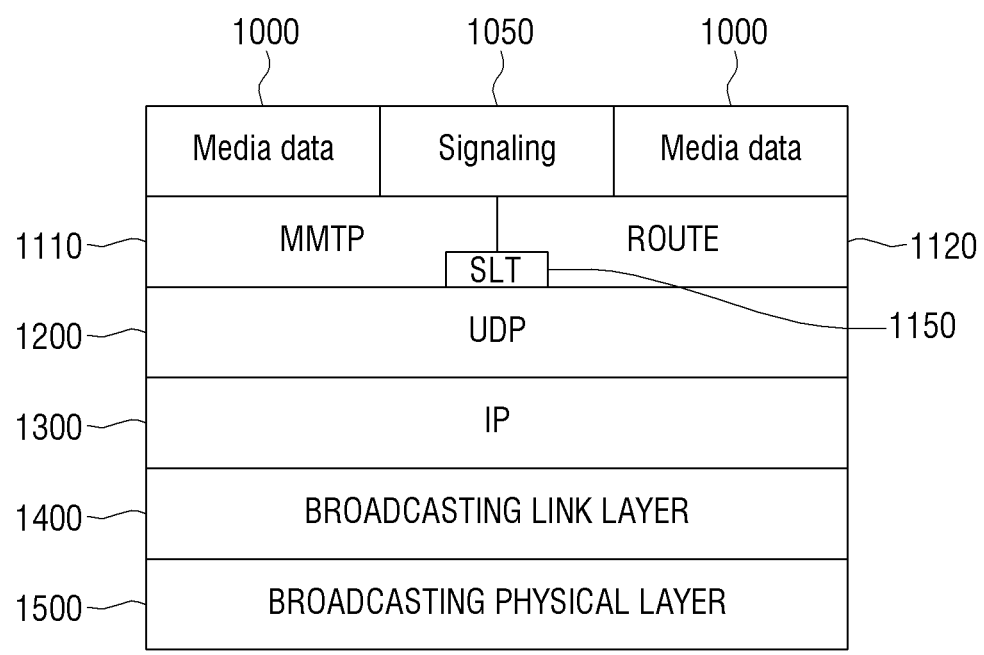
FIG. 1 is a view provided to explain a hierarchical structure of a transmitting system according to an exemplary embodiment.

FIG. 1 is a diagram illustrating a hierarchical structure of a transmitting system according to an exemplary embodiment.

Referring to FIG. 1, a service includes media data 1000 and signaling 1050 for transferring information required to acquire and consume the media data at a receiver. The media data may be encapsulated in a format suitable for transmission prior to the transmission. An encapsulation method may follow a Media Processor (MPU) defined in ISO/IEC 23008-1 MPEG Media Transport (MMT) or a DASH segment format defined in ISO/IEC 23009-1 Dynamic Adaptive Streaming over HTTP (DASH). The media data 1000 and the signaling 1050 are packetized according to an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information about an application layer protocol, by which a service is transmitted, by an independent method different from the application layer protocol is required for the receiver to know by which application layer protocol the service is transmitted.

A service list table (SLT) 1150 illustrated in FIG. 1 represents or indicates a signaling method and packetizes information about the service in a table for satisfying the aforementioned object. Detailed contents of the SLT will be described below. The packetized media data and the signaling including the SLT are transferred to a broadcasting link layer 1400 through a user datagram protocol (UDP) 1200 and an Internet protocol (IP) 1300. An example of the broadcasting link layer 1400 includes an ATSC 3.0 link-layer protocol (ALP) defined in the ATSC 3.0 standard (hereafter, referred to as 'ATSC 3.0'). The ALP protocol generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG2-transport stream (TS) packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio signal, and transmits the radio signal. In this case, the broadcasting physical layer 1500 has at least one signal processing path. An example of the signal processing path may include a physical layer pipe (PLP) of ATSC 3.0 or the Digital Video Broadcasting—Second Generation Terrestrial (DVB-T2) standard, and one or more services or some of the services may be mapped to the PLP. Herein, the PLP indicates a signal path which is processed independently. In other words, services (for example, video, extended video, audio, data stream, etc.) may be transmitted and received through a plurality of RF channels, and the PLP refers to a path where these services are transmitted or received, or a stream which is transmitted through the path. The PLP may be located at slots which are distributed at time intervals on a plurality of RF channels, or may be distributed at time intervals on one RF channel. In other words, a single PLP may be distributed and transmitted with time intervals on one or a plurality of RF channels.

Figure 2:
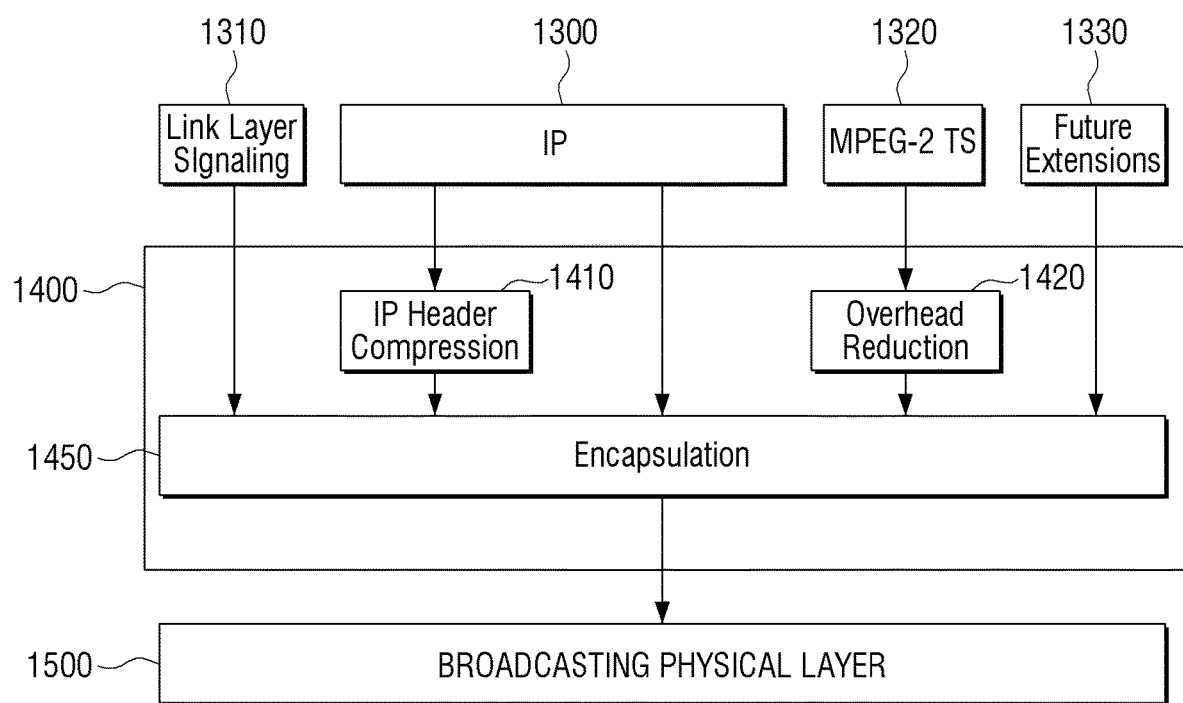
FIG. 2 is a view provided to schematically explain a broadcasting link layer 1400 according to an exemplary embodiment.

FIG. 2 is a diagram illustrating a schematic configuration of the broadcasting link layer 1400, according to an exemplary embodiment.

Referring to FIG. 2, the input of the broadcasting link layer 1400 includes the IP packet 1300, and may further include link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410 and the MPEG2-TS packet may be subjected to an overhead reduction process 1420. During the ALP packetization, input packets may be subjected to dividing and merging processes.

Figure 3A:
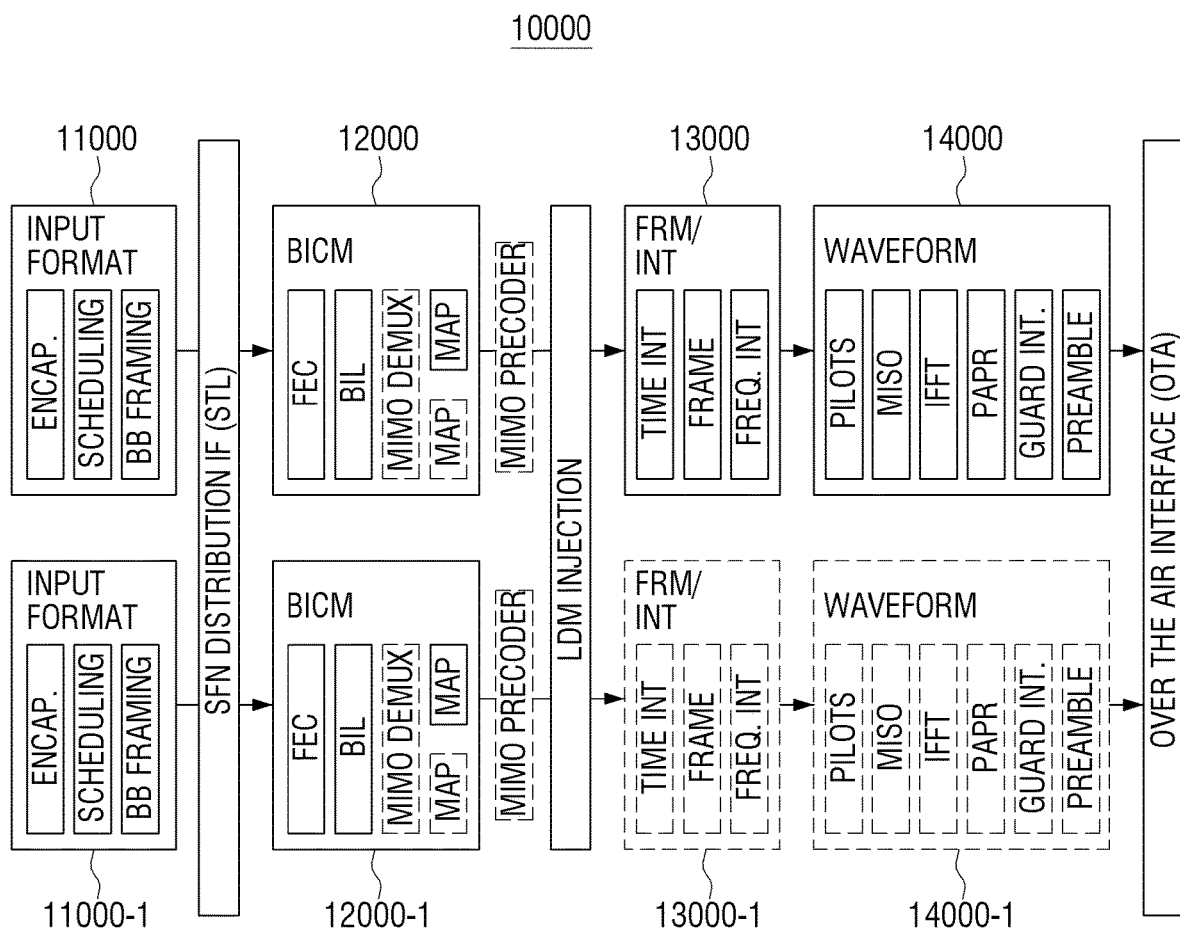
FIG. 3A is a view provided to schematically explain a transmitting system (or transmitting apparatus) according to an exemplary embodiment.

FIG. 3A is a diagram illustrating a schematic configuration of a transmitting system or a transmitting apparatus, according to an exemplary embodiment. According to FIG. 3A, a transmitting system 10000 according to the exemplary embodiment may include input formatting blocks 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream of data to be serviced. Herein, the input stream may be a transport stream (TS), Internet packets (IP) (e.g., IPv4 and IPv6), an MPEG media transport (MMT), a generic stream (GS), generic stream encapsulation (GSE), and the like. For example, an ATSC 3.0 link-layer protocol (ALP) packet may be generated based on the input stream, and the baseband packet may be generated based on the generated ALP packet.

The bit interleaved and coded modulation (BICM) blocks 12000 and 12000-1 determine an forward error correction (FEC) coding rate and a constellation order according to an area (fixed PHY frame or mobile PHY frame) through which the data to be serviced will be transmitted, and perform encoding and time interleaving. Meanwhile, signaling information about the data to be serviced may be encoded through a separate BICM encoder according to a system design or encoded by sharing a BICM encoder with the data to be serviced.

The framing/interleaving blocks 13000 and 13000-1 combine the time-interleaved data with a signaling signal including the signaling information to generate a transmission frame.

The waveform generation blocks 14000 and 14000-1 generate an Orthogonal Frequency-Division Multiplexing (OFDM) signal in a time domain from the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Herein, the blocks marked with the solid line are normal blocks, and the blocks marked with the dotted lines are blocks which may be used when informative multiple-input multiple-output (MIMO) is implemented.

Figure 3B:
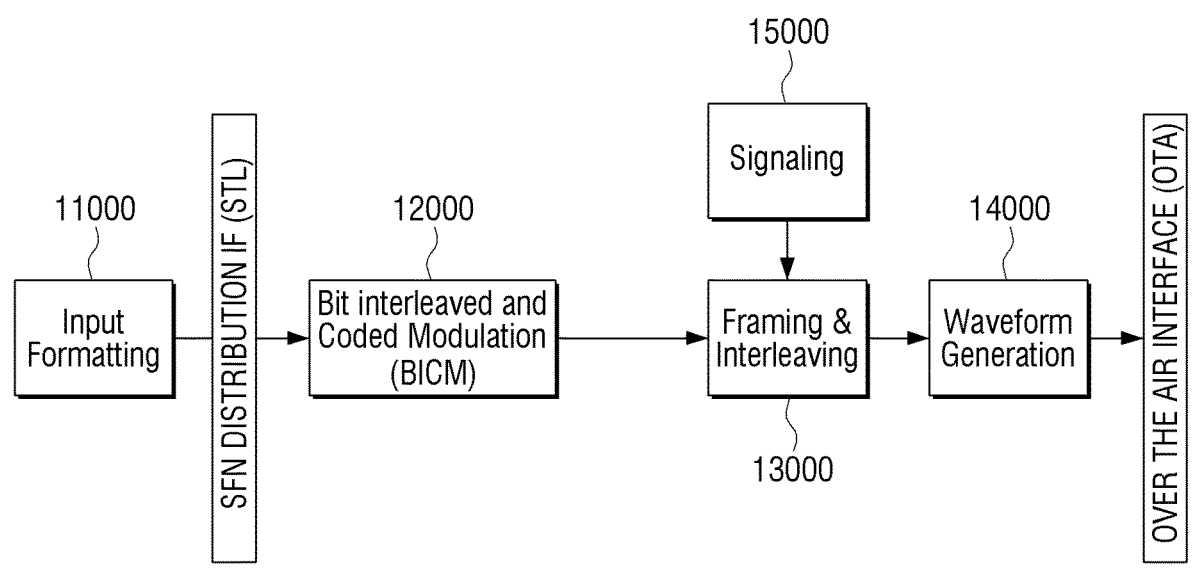
FIGS. 3B and 3C are views provided to explain a multiplexing method according to exemplary embodiments.
Figure 3C:
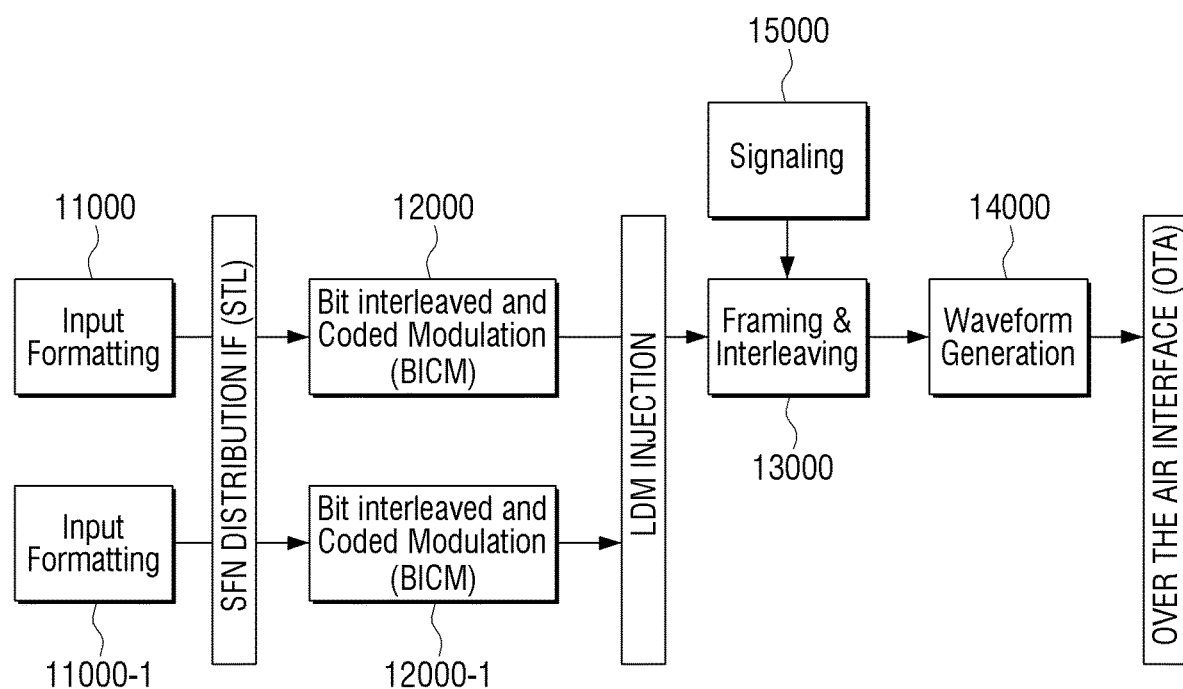

FIGS. 3B and 3C are diagrams illustrating a multiplexing method, according to exemplary embodiments.

FIG. 3B illustrates a block diagram for implementing time division multiplexing (TDM), according to an exemplary embodiment.

A TDM system architecture includes four main blocks (alternatively, parts) of the input formatting block 11000, the BICM block 12000, the framing/interleaving block 13000, and the waveform generation block 14000.

Data is input and formatted in the input formatting block 11000 and forward error correction is applied to the data in the BICM block 12000. Next, the data is mapped to a constellation. Subsequently, the data is time and frequency-interleaved in the framing/interleaving block 13000 and a frame is generated. Thereafter, an output waveform is generated in the waveform generation block 14000.

FIG. 3C illustrates a block diagram for implementing layered division multiplexing (LDM), according to an exemplary embodiment.

An LDM system architecture includes several other blocks as compared with the TDM system architecture. In detail, two separated input formatting blocks 11000 and 11000-1 and the BICM blocks 12000 and 12000-1 for one of respective layers of the LDM are included in the LDM system architecture. The blocks are combined in an LDM injection block before the framing/interleaving block 13000. And, the waveform generation block 14000 is similar to the TDM.

Figure 4:
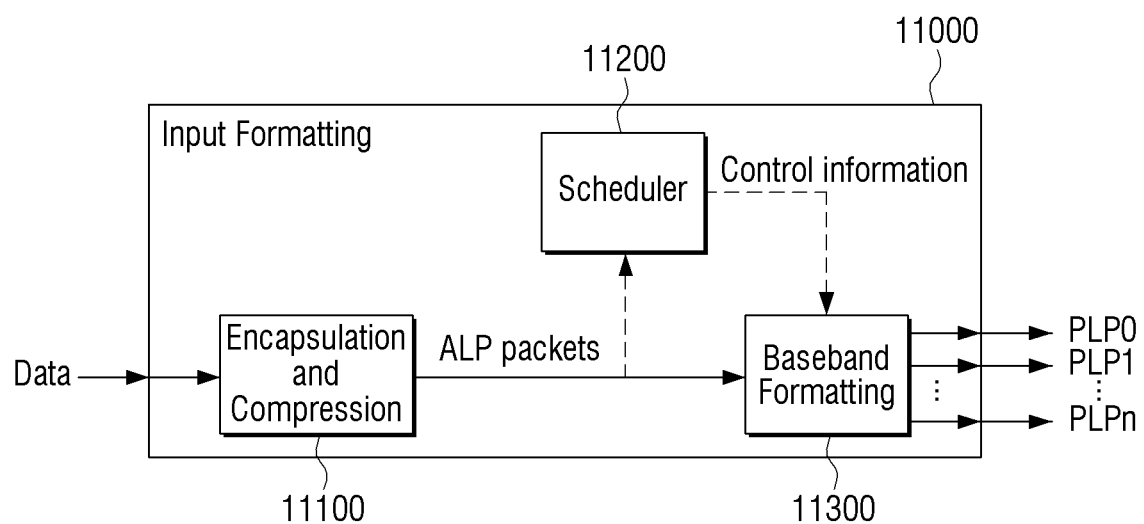
FIG. 4 is a block diagram illustrating in detail a configuration of an input formatting block of FIG. 3A according to an exemplary embodiment.

FIG. 4 is a block diagram illustrating a detailed configuration of the input formatting block 11000 illustrated in FIG. 3A, according to an exemplary embodiment.

As illustrated in FIG. 4, the input formatting block 11000 includes three blocks that control packets distributed to PLPs. In detail, the input formatting block 11000 includes an encapsulation and compression block 11100, a baseband formatting block (alternatively, baseband framing block) 11300, and a scheduler block 11200.

An input stream input to the encapsulation and compression block 11100 may be various types. For example, the input stream may be a transport stream (TS), an Internet packets (IP) (e.g., IPv4 and IPv6), an MPEG media transport (MMT), a generic stream (GS), a generic stream encapsulation (GSE), and the like.

Packets output from the encapsulation and compression block 11100 become ALP packets (generic packets) (also referred to as L2 packets). Herein, a format of an ALP packet may be one of the Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet is 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

Meanwhile, an operation of the scheduler block 11200 is constrained to a set of dynamic, quasi-static, and static components. Definition of the constraint may vary according to user implementation.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
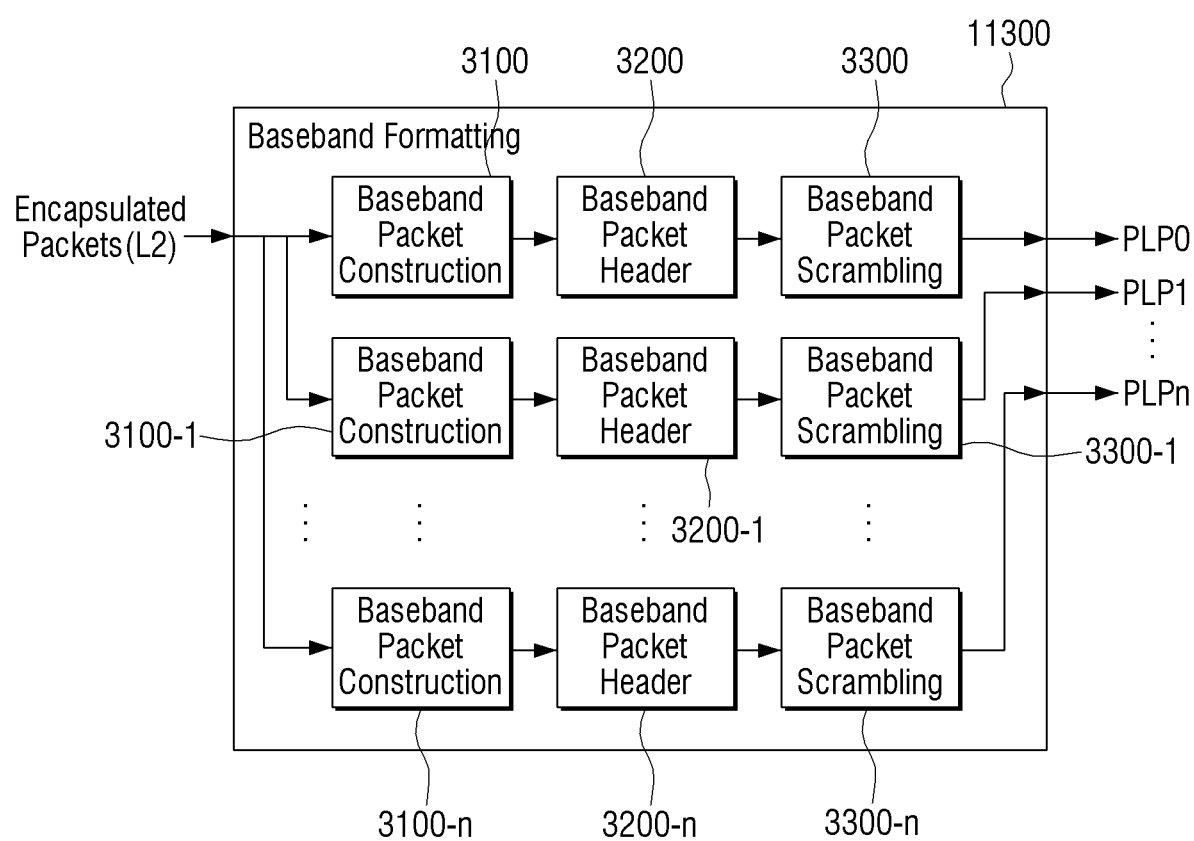
FIGS. 5A and 5B are views provided to explain in detail a baseband framing block according to exemplary embodiments.

The baseband formatting block 11300 includes baseband packet construction blocks 3100, 3100-1, . . . 3100-n, baseband packet header construction blocks 3200, 3200-1, . . . , 3200-n, and baseband packet scrambling blocks 3300, 3300-1, . . . , 3300-n, as illustrated in FIG. 5A. In an M-PLP operation, the baseband formatting block generates a plurality of PLPs as necessary.

Figure 5B:
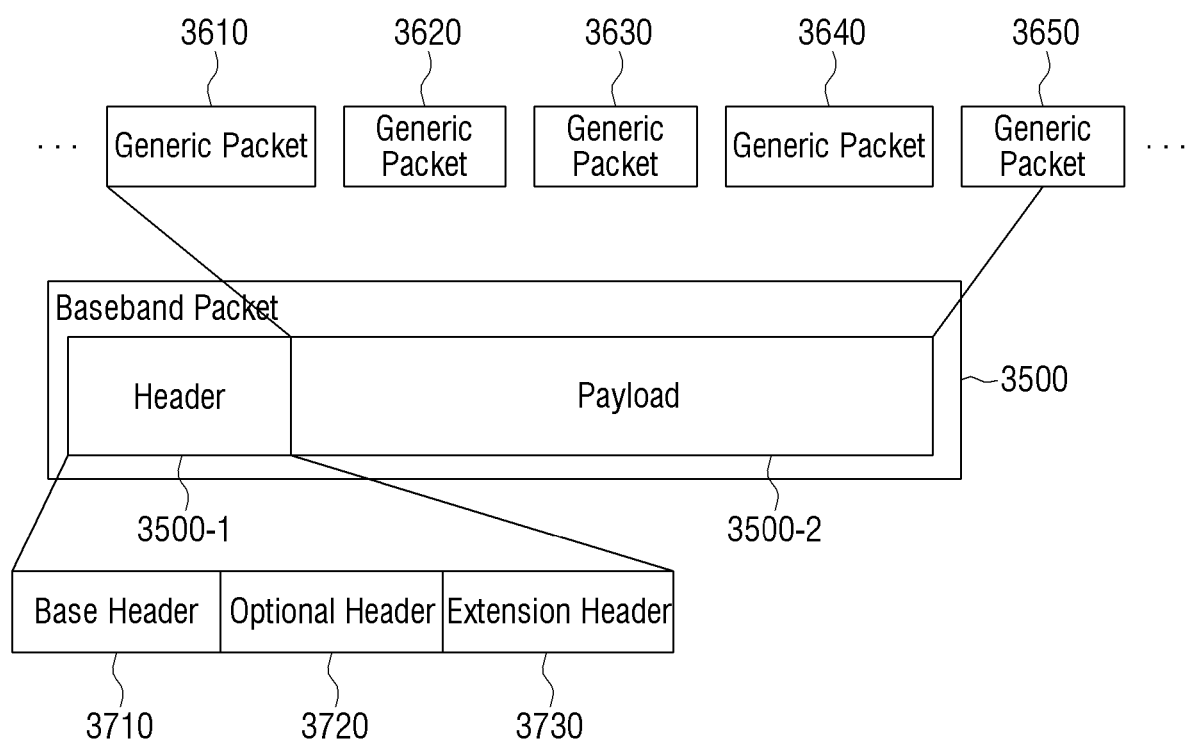

The baseband packet construction blocks 3100, 3100-1, . . . , 3100-n construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500, these packets are distributed between a current baseband packet and a next baseband packet. The ALP packets are distributed in a unit of a byte.

The baseband packet header construction blocks 3200, 3200-1, . . . , 3200-n construct a header 3500-1. The header 3500-1 includes three parts, that is, a base field (also referred to as, a base header) 3710, an optional field (also referred to as, an option header) 3720, and an extension field (also referred to as, an extension header) 3730, as illustrated in FIG. 5B. Herein, the base field 3710 is shown in every baseband packet and the optional field 3720 and the extension field 3730 may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and for example, used for a baseband packet counter, baseband packet time stamping, additional signaling, and the like.

The baseband packet scrambling blocks 3300, 3300-1, . . . , 3000-n scramble the baseband packet.

Figure 6:
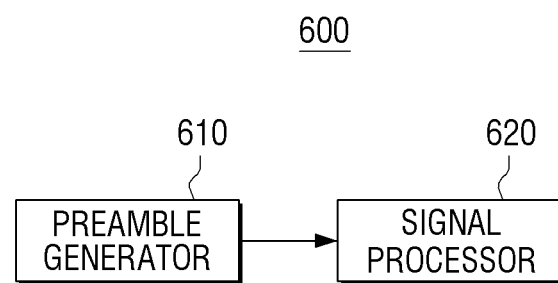
FIG. 6 is a block diagram illustrating a configuration of the transmitting apparatus according to an exemplary embodiment.

FIG. 6 is a block diagram illustrating a configuration of a transmitting apparatus according to an exemplary embodiment.

Referring to FIG. 6, the transmitting apparatus 600 includes a frame generator 610, and a signal processor 620.

The frame generator 610 generates a frame including a plurality of OFDM symbols.

In this case, the plurality of OFDM symbols may be divided into a bootstrap, a preamble that includes an L1 basic and an L1 detail, and a payload. This will be explained in more detail hereinafter with reference to FIG. 7.

Figure 7:
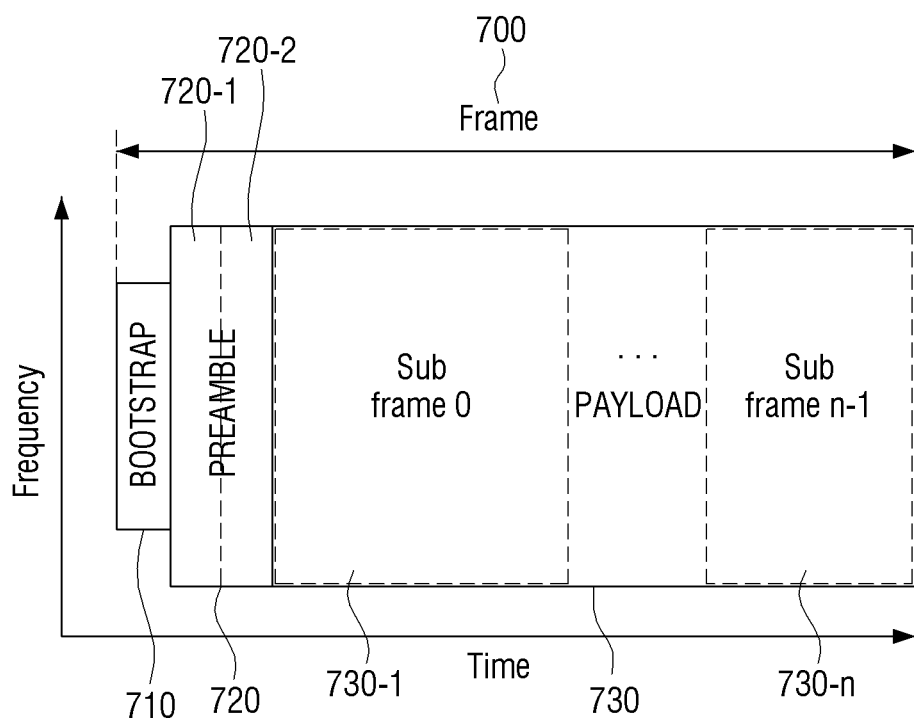
FIG. 7 is a view provided to explain a configuration of a frame according to an exemplary embodiment.

FIG. 7 is a view provided to explain a configuration of a frame according to an exemplary embodiment.

Referring to FIG. 7, a frame 700 may be represented by a combination of three basic configurations. Specifically, the frame 700 may include a bootstrap 710 located in a starting portion of each frame, a preamble 720 located next to the bootstrap 710, and a payload 730 located next to the preamble 720.

In this case, the preamble 720 includes an L1 control signaling to be used a receiving apparatus of the frame to process data included in the payload 730.

Furthermore, the payload 730 includes at least one sub frame 730-1 . . . 730-n. In the case where there are a plurality of such sub frames in the payload 730, all these sub frames would be connected to one another with respect to a time axis illustrated in FIG. 7.

Each of these sub frames 730-1 . . . 730-n has an FFT size of OFDM symbols, a guard interval (GI) length, a pattern of a scattered pilot, and an effective carrier count. And the FFT size, the GI length, the pattern of the scattered pilot, and the effective carrier count are the same in a same sub frame. On the other hand, different sub frames 730-1 . . . 730-n in the frame 700 may have different FFT sizes, GI lengths, scattered pilot patterns, and effective carrier counts.

Especially, the bootstrap 710 may include a sync symbol that is located where each frame starts and that is configured to detect a signal, match synchronization minutely, measure a frequency offset, and perform initial channel estimation.

Furthermore, the bootstrap 710 may include a control signaling necessary for receiving and decoding a portion (preamble 720, payload 730) of the frame 710 other than the bootstrap 170.

Specifically, the bootstrap 710 uses a fixed 6.144 Ms/sec sampling rate, and a fixed 4.5 Mhz bandwidth.

Meanwhile, the preamble 720 includes an L1 basic 720-1 and an L1 detail 720-2. Specifically, the L1 basic 720-1 includes information on a forward error correction (FEC)-type, a Mod/cod, a number of symbols included in the preamble, and an L1 detail length etc. necessary for decoding the L1 detail 720-2.

Furthermore, the L1 detail 720-2 includes information on the number of sub frames 730-1 . . . 730-n included in the payload 730, and on a Mod/code of the symbols included in each sub frame 730-1 . . . 730-n etc.

Hereinafter, a process for generating the bootstrap 710 will be explained with reference to FIG. 8.

Figure 8:
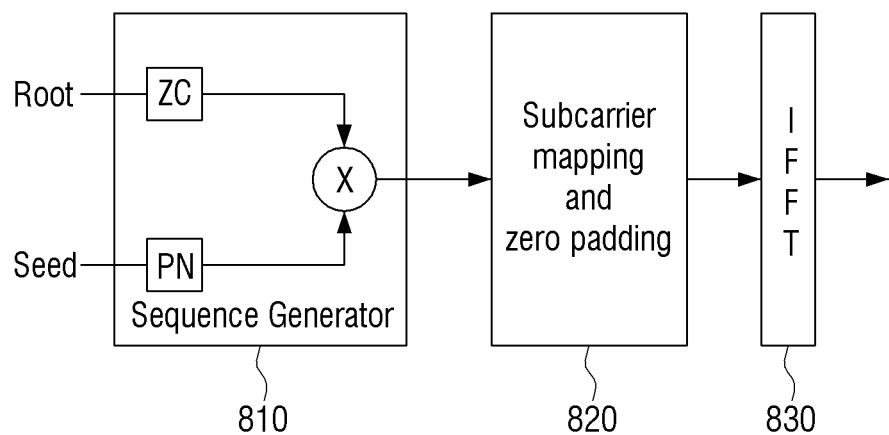
FIG. 8 is a view provided to explain a process for generating a bootstrap in a frequency domain according to an exemplary embodiment.

FIG. 8 is a view provided to explain a process for generating a bootstrap in a frequency domain.

Referring to FIG. 8, a sequence generator 810 may perform modulation on a ZC (zadoff chu) sequence using a PN (pseudo-noise) sequence. In this case, a ZC Root and a PN seed may each be signaled as a positive (+) value and a negative (−) value of the bootstrap, respectively.

Accordingly, the values used for each bootstrap symbol start from the ZC (zadoff chu) sequence being modulated by the PN (pseudo-noise) sequence.

Furthermore, a complex sequence generated from the sequence generator 810 may be mapped to a subcarrier through a subcarrier mapping and zero padding unit 820, and the complex sequence mapped to the subcarrier may be subjected to Inverse Fast Fourier Transform (IFFT) through an IFFT unit 830. In such a process, the bootstrap 710 may be generated.

Referring to FIG. 7 once again, the bootstrap 710 includes information on an Fast Fourier Transform (FFT) size of OFDM symbols constituting the preamble 720, a length of a GI inserted into the preamble 720, a pattern of a preamble pilot inserted into the preamble 720, and information on an L1 basic mode.

Specifically, the bootstrap 710 includes information on the FFT size of the OFDM symbols constituting the L1 basic 720-1 of the preamble 720, the length of the GI inserted into the L1 basic 720-1, the pattern of the preamble pilot inserted into the L1 basic 720-1, and information on the L1 basic mode.

The information included in the bootstrap 710 may be illustrated as in FIG. 9.

FIG. 9 is a view illustrating signaling fields of a bootstrap.

In FIG. 9, a signaling field 910 regarding bootstrap symbol 1, a signaling field 920 regarding bootstrap symbol 2, and a signaling field 930 regarding bootstrap symbol 3 are illustrated.

The signaling field 930 regarding bootstrap symbol 3 includes information on a preamble structure, and information on the preamble structure may include the FFT size of the OFDM symbols constituting the preamble 720, the length of the GI inserted into the preamble 720, and the pattern of the preamble pilot inserted into the preamble 720, and information on the L1 basic mode.

Referring to FIG. 6 once again, the signal processor 620 signal-processes the frame generated in the signal-processor 620. Specifically, the signal processor 620 may correspond to the waveform generation block 14000 explained with reference to FIG. 3A. A process being performed in the waveform generation block 14000 explained with reference to FIG. 3A will be schematically explained.

The waveform generation block 14000 explained with reference to FIG. 3A may include a pilot insertion block, a MISO block, an IFFT block, a peak-to-average power ratio (PAPR) block, a GI insertion block, and a bootstrap block.

The pilot insertion block inserts at least one of a preamble pilot, a scattered pilot, a subframe boundary pilot, a continual pilot, and an edge pilot in a frame generated in the frame generator 610.

Furthermore, the MISO block may apply a Transmit Diversity Code Filter to perform MISO pre-distortion, and perform IFFT on the frame so that each OFDM symbol may be divided into an effective area (useful part) and a GI.

Furthermore, the PAPR block may perform modification, tone reservation and active constellation of an output OFDM signal in order to reduce the PAPR of the output OFDM signal.

Thereafter, the GI insertion block may insert a GI into the frame. Patterns of an insertable GI may be defined according to the FFT size of the OFDM symbols as in Table 1 below.

TABLE 1

| GI Pattern | Duration in Samples | 8K FFT | 16K FFT | 32K FFT |
|---|---|---|---|---|
| GI1_192 | 192 | ✓ | ✓ | ✓ |
| GI2_384 | 384 | ✓ | ✓ | ✓ |
| GI3_512 | 512 | ✓ | ✓ | ✓ |
| GI4_768 | 768 | ✓ | ✓ | ✓ |
| GI5_1024 | 1024 | ✓ | ✓ | ✓ |
| GI6_1535 | 1536 | ✓ | ✓ | ✓ |
| GI7_2048 | 2048 | ✓ | ✓ | ✓ |
| GI8_2432 | 2432 | | ✓ | ✓ |
| GI9_3072 | 3072 | | ✓ | ✓ |
| GI10_3648 | 3648 | | ✓ | ✓ |
| GI11_4096 | 4096 | | ✓ | ✓ |
| GI12_4864 | 4864 | | | ✓ |

Furthermore, the bootstrap generated through the process explained with reference to FIG. 8 is inserted into the frame.

Hereinafter, explanation will be made in detail on the information included in the bootstrap 710.

Specifically, the bootstrap 710 includes the information on the FFT size of the OFDM symbols constituting the preamble 720, the length of the GI inserted into the preamble 720, and the pattern of the preamble pilot inserted into the preamble 720, and the information on the L1 basic mode.

Here, a predetermined GI length that is the same or greater than a GI length of a first sub frame 730-1 of the plurality of sub frames 730-1 ... 730-n included in the payload 730 is determined as a GI length inserted into the preamble 720.

In this case, the predetermined GI length may depend on each FFT size as defined in above Table 1.

For example, if the FFT size of the OFDM symbols included in the first sub frame 730-1 of the plurality of sub frames 730-1 ... 730-n included in the payload 730 is 16K FFT, and the GI length inserted into the first sub frame 730-1 is 3072, one of 3072, 3648 and 4096 may be determined as the GI length inserted into the preamble 720.

Otherwise, a predetermined GI length that is the same or greater than the GI length of the sub frame having the greatest GI length among the plurality of sub frames 730-1 ... 730-n may be determined as the GI length inserted into the preamble 720.

Specifically, a predetermined GI length that is the same or greater than the greatest GI length of the GI lengths inserted into each of the plurality of sub frames 730-1 ... 730-n may be determined as the GI length inserted into the preamble 720.

The reason why such a predetermined GI length that is the same or greater than the GI length of the first sub frame 730-1 of the plurality of sub frames 730-1 ... 730-n included in the payload 730 or that is the same or greater than the GI length of the sub frame having the greatest GI length of the plurality of sub frames is determined as the GI length inserted into the preamble 720 is to increase density of the preamble pilot being inserted into the preamble 720. The greater is the GI length, the greater is the density of the preamble pilot being inserted into the preamble 720.

Meanwhile, a pattern of a scattered pilot having the greatest scattered pilot density corresponding to the determined length of the GI inserted into the preamble 720 is determined as the pattern of the preamble pilot. This is to increase the density of the preamble pilot being inserted into the preamble 720 as well.

Hereinafter, the preamble pilot and the scattered pilot will be explained in more detail.

According to the ATSC 3.0 standard, pilots are inserted into the preamble 720 and the sub frames 730-1 . . . 730-n for channel estimation and synchronization.

Pilot types to be inserted into the preamble 720 and the sub frame 730-1 . . . 730-n are as shown in table 2 below.

TABLE 2

| Symbol Type | Preamble Pilot | Scattered Pilot | Subframe Boundary Pilot | Continual Pilot | Edge Pilot |
|---|---|---|---|---|---|
| Preamble | ✓ | | | ✓ | |
| Data | | ✓ | | ✓ | ✓ |
| Subframe Boundary | | | ✓ | ✓ | ✓ |

Referring to Table 2, the preamble pilot is inserted into the preamble, and the scattered pilot (SP) is inserted into a data symbol, and the subframe boundary pilot is inserted into a sub frame boundary symbol. Furthermore, the continual pilot (CP) is inserted into the preamble, the data symbol, and the sub frame boundary symbol, and the edge pilot is inserted into the data symbol and the sub frame boundary symbol.

Meanwhile, locations in which the pilots are inserted may be defined by indexes of carriers themselves to which the pilots are inserted, or based on a certain pilot pattern (for example, Dx, Dy). In this case, the Dx is a difference in carrier index between adjacent carriers in which the pilots are inserted in the frequency direction (this is defined as separation of pilot bearing carriers (that is, in a frequency direction) in the Advanced Television Systems Committee (ATSC) 3.0 standard, and a difference in carrier index between adjacent scattered-pilot-bearing carriers in the DVB-T2 (Digital Video Broadcasting-Terrestrial version 2)). The Dy means a difference in symbol number between successive pilots on a certain carrier in time direction (this is defined as a number of symbols forming one scattered pilot sequence (time direction) in the ATSC 3.0, and a difference in symbol number between successive scattered pilots on a given carrier in the DVB-T2).

First of all, the locations in which the preamble pilot are inserted may be determined based on the Dx and Dy. In the case of the preamble pilot, since Dy=1, the preamble pilot is inserted into a same location for each preamble symbol. Specifically, the preamble pilot may be inserted into cells having a carrier index k (that is, carriers) that satisfy k mod Dx=0 in the preamble. In this case, the Dx may be one of 3, 4, 6, 8, 12, and 16, and a system (e.g., a transmitting and/or reception apparatus) may select one of them according to the density which will be explained hereinbelow.

A location in which the scattered pilot is inserted may be determined based on the Dx and Dy. Specifically, the scattered pilot may be inserted into a carrier having an index k in a first OFDM symbol that satisfies Equation 1 below.

$$k \bmod (D_x D_y) = D_x (l \bmod D_y) \quad (1)$$

In this case, the Dx and Dy may be defined as shown in Table 3 below, and SPa_b means a pilot pattern that satisfies a=Dx, and b=Dy.

TABLE 3

| Pilot Pattern | Dx | Dy |
|---|---|---|
| SP3_2 | 3 | 2 |
| SP3_4 | 3 | 4 |

TABLE 3-continued

| Pilot Pattern | Dx | Dy |
|---|---|---|
| SP4_4 | 4 | 2 |
| SP4_4 | 4 | 4 |
| SP6_2 | 6 | 2 |
| SP6_4 | 6 | 4 |
| SP8_2 | 8 | 2 |
| SP8_4 | 8 | 4 |
| SP12_2 | 12 | 2 |
| SP12_4 | 12 | 4 |
| SP16_2 | 16 | 2 |
| SP16_4 | 16 | 4 |
| SP24_2 | 24 | 2 |
| SP24_4 | 24 | 4 |
| SP32_2 | 32 | 2 |
| SP32_4 | 32 | 4 |

Meanwhile, the system may select one of the SPa_bs defined as shown in above Table 3 according to channel environment.

Especially, the pattern of the scattered pilot may be represented as shown in Table 4 below according to the length of the GI inserted into the payload 730 and the size of the OFDM symbols constituting the payload 730.

TABLE 4

| GI Patern | Samples | 8K FFT | 16K FFT | 32K FFT |
|---|---|---|---|---|
| GI1_192 | 192 | SP32_2, SP32_4, SP16_2, SP16_4 | SP32_2, SP32_4 | SP32_2 |
| GI2_384 | 384 | SP16_2, SP16_4, SP8_2, SP8_4 | SP32_2, SP32_4, SP16_2, SP16_4 | SP32_2 |
| GI3_512 | 512 | SP12_2, SP12_4, SP6_2, SP6_4 | SP24_2, SP24_4, SP12_2, SP12_4 | SP24_2 |
| GI4_768 | 768 | SP8_2, SP8_4, SP4_2, SP4_4 | SP16_2, SP16_4, SP8_2, SP8_4 | SP32_2, SP16_2 |
| GI5_1024 | 1024 | SP6_2, SP6_4, SP3_2, SP3_4 | SP12_2, SP12_4, SP6_2, SP6_4 | SP24_2, SP12_2 |
| GI6_1535 | 1536 | SP4_2, SP4_4 | SP8_2, SP8_4, SP4_2, SP4_4 | SP16_2, SP8_2 |
| GI6_2048 | 2048 | SP3_2, SP3_4 | SP6_2, SP6_4, SP3_2, SP3_4 | SP12_2, SP6_2 |
| GI6_2432 | 2432 | N/A | SP6_2, SP6_4, SP3_2, SP3_4 | SP12_2, SP6_2 |
| GI6_3072 | 3072 | N/A | SP4_2, SP4_4 | SP8_2, SP3_2 |
| GI6_3648 | 3648 | N/A | SP4_2, SP4_4 | SP8_2, SP3_2 |
| GI6_4096 | 4096 | N/A | SP3_2, SP3_4 | SP6_2, SP3_2 |
| GI6_4864 | 4864 | N/A | N/A | SP6_2, SP3_2 |

Referring to above Table 4, a pattern of insertable scattered pilots is defined according to an FFT size (8K FFT, 16K FFT, 32K FFT) of the OFDM symbols that constitute the payload 730, and the length of the GI (192, 384, 512, 768, 1024, 1536, 2048, 2432, 3072, 3648, 4096, 4864) inserted into the payload 730.

For example, when the FFT size of the OFDM symbols constituting the payload 730 is 16K FFT, and the length of the inserted GI is 1536, one of SP8_2, SP8_4, SP4_2, and SP4_4 may be determined as the pattern of the insertable scattered pilot.

Furthermore, even for a same FFT size of the OFDM symbol, the pattern of the insertable scattered pilot may differ depending on the length of the inserted GI.

Meanwhile, a location in which the sub frame boundary pilot is inserted may be determined based on the Dx and Dy. In the case of the sub frame boundary pilot, Dy=1 is satisfied, and thus the sub frame boundary pilot is inserted into a same location for each sub frame boundary symbol. Specifically, the sub frame boundary pilot may be inserted into cells having a carrier index k that satisfies k mod Dx=0 in the sub frame boundary symbol. In this case, the Dx may be 3, 4, 6, 8, 12, 16, 24, 32, and the system may select one of them depending on channel environment.

Furthermore, locations in which the successive pilots are inserted are defined by indexes of the carriers in which the pilots are inserted. Specifically, the successive pilots may be inserted into different locations according to the FFT size.

Meanwhile, as aforementioned, the pattern of the preamble pilot is determined as the scattered pilot pattern having the greatest scattered pilot density among scattered pilot patterns corresponding to the determined GI. Specifically, among the scattered pilot patterns corresponding to the GI length inserted into the preamble 720, the scattered pilot pattern having the greatest scattered pilot density is determined as the pattern of the preamble pilot.

However, in the case of the preamble pilot, Dy=1 is defined, and thus consequently, what determines the density of the preamble pilot is the Dx of the pattern of the preamble pilot.

Accordingly, information on the pattern of the preamble pilot included in the bootstrap 710 includes Dx information about the pattern of the preamble pilot, and the Dx of the pattern of the scattered pilot is determined as a Dx having the greatest density among Dxs of the pattern of the scattered pilot.

The information on the pattern of the preamble pilot includes Dy information on the pattern of the preamble pilot, but in this case, the Dy is fixed to 1.

Hereinafter, explanation will be made on a process where the Dx of the pattern of scattered pilot is determined as a Dx having the greatest density among Dxs of the pattern of the scattered pilot.

For example, in the case where 1536 is determined as the length of the GI inserted into the preamble 720 (of course, it is determined based on a precondition that it is greater than the GI length of the first sub frame 730-1 of the plurality of sub frames 730-1 . . . 730-n included in the payload 730 as aforementioned), the pattern of the insertable scattered pilot under the condition where the GI length of the pattern of the scattered pilot is 1536 and the FFT size is 16K may be one of SP8_2, SP8_4, SP4_2, and SP4_4.

In this case, since the Dy of the pattern of the preamble pilot is fixed to 1, considering only the Dx of the patterns of the insertable scattered pilot SP8_2, SP8_4, SP4_2, and SP4_4, the Dx of the scattered pilot is 4 or 8.

Since the Dx refers to a difference of carrier index between adjacent carriers in which the pilots are inserted, the smaller the difference of carrier index, the higher the density, and thus among Dxs of the scattered pilot, 4 and 8, the Dx with the greatest density is 4.

Accordingly, 4 is determined as the Dx of the pattern of the preamble pilot.

By way of another example, under the condition where 2048 is determined as the length of the GI inserted into the preamble 720 and the FFT size of the preamble 720 is 16K, the pattern of the insertable scattered pilot may be one of SP6_2, SP6_4, SP3_2, and SP3_4.

In this case, since the Dy of the pattern of the preamble pilot is fixed to 1, considering only Dxs of the patterns of the insertable scattered pilot SP6_2, SP6_4, SP3_2, and SP3_4, the Dx of the scattered pilot is 3 or 6.

Likewise, since the Dx is a difference of carrier index between adjacent carriers in which the pilots are inserted, the smaller the difference of index, the higher the density. Thus, among Dxs 3 and 6, the Dx with the greatest density is 3.

Accordingly, 3 is determined as the Dx of the pattern of the preamble pilot.

Meanwhile, the Dx of the pattern of the preamble pilot may be one of multiples of 3 and multiples of 4. This is because, referring to Table 4, all Dxs of the pattern of the scattered pilot that determine Dxs of the pattern of the preamble pilot consist of multiples of 3 (3, 6, 12) and multiples of 4 (4, 8, 12, 16, 24, and 32).

Information on the pattern of the preamble pilot determined according to the aforementioned process may be sort out according to the FFT size and GI length as shown in Table 5 below.

TABLE 5

| FFT Size | GI Length (samples) | Pilot Pattern (Dx) |
|---|---|---|
| 8192 | 2048 | 3 |
| 8192 | 1536 | 4 |
| 8192 | 1024 | 3 |
| 8192 | 768 | 4 |
| 16384 | 4096 | 3 |
| 16384 | 3648 | 4 |
| 16384 | 2432 | 3 |
| 16384 | 1536 | 4 |
| 16384 | 1024 | 6 |
| 16384 | 768 | 8 |
| 32768 | 4864 | 3 |
| 32768 | 3648 | 3 |
| 32768 | 3648 | 8 |
| 32768 | 2432 | 6 |
| 32768 | 1536 | 8 |
| 32768 | 1024 | 12 |
| 32768 | 768 | 16 |

Table 5 shows information on the FFT size of the OFDM symbols constituting the preamble 720, the length of the GI inserted into the preamble 720, and the pattern of the preamble pilot inserted into the preamble 720 (i.e., information on the Dxs of the pattern of the preamble pilot).

Specifically, the Dxs of the pattern of the preamble pilot are sorted out according to the FFT size of the OFDM symbols that constitute the preamble 720, and the length of the GI inserted into the preamble 720, and the Dx corresponding to the FFT size of the OFDM symbols and the length of the GI inserted into the preamble 720 and having the greatest density is determined as the Dx of the pattern of the preamble pilot.

In the case where the FFT size of the OFDM symbols constituting the preamble 720 is 32K, and the length of the GI inserted into the preamble 720 is 3648, the Dx of the pattern of the preamble pilot may be 3 or 8. That is, when considering the density only, the density is greater when the Dx is 3 than when the Dx is 8, but depending on channel environment, in the case where the FFT size of the OFDM symbols constituting the preamble 720 is 32K, and the length of the GI inserted into the preamble 720 is 3648, it may be determined that the Dx of the pattern of the preamble pilot is 3 or 8.

Furthermore, referring to Table 5, the Dx of the pattern of the preamble pilot is one of 3, 4, 6, 8, 12, and 16.

Meanwhile, Table 5 does not show information on the L1 basic mode. That is, the bootstrap 710 includes information on the FFT size of the OFDM symbols constituting the preamble 720, the length of the GI inserted into the preamble 720, and the pattern of the preamble pilot inserted into the preamble 720 and information on the L1 basic mode.

However, Table 5 does not show information on the L1 basic mode because the same information in Table 5 may be applied for each L1 basic mode.

That is, the information on the FFT size of the OFDM symbols constituting the preamble 720, the length of the GI length into the preamble 720, and the pattern of the preamble pilot inserted into the preamble 720 include a total of 17 cases which may be applied identically to each L1 basic mode repeatedly.

Specifically, there are a total of seven (7) L1 basic modes, and the information on the FFT size of the OFDM symbols constituting the preamble 720, the length of the GI inserted into the preamble 720, and the pattern of the preamble pilot inserted into the preamble 720 sorted out by each L1 basic mode is as shown in Tables 6 to 12.

TABLE 6

| preamble_structure | L1-Basic Mode | FFT Size | GI Length (samples) | Pilot Pattern (Dx) |
|---|---|---|---|---|
| 0 | L1-Basic Mode 1 | 8192 | 2048 | 3 |
| 1 | L1-Basic Mode 1 | 8192 | 1536 | 4 |
| 2 | L1-Basic Mode 1 | 8192 | 1024 | 3 |
| 3 | L1-Basic Mode 1 | 8192 | 768 | 4 |
| 4 | L1-Basic Mode 1 | 16384 | 4096 | 3 |
| 5 | L1-Basic Mode 1 | 16384 | 3648 | 4 |
| 6 | L1-Basic Mode 1 | 16384 | 2432 | 3 |
| 7 | L1-Basic Mode 1 | 16384 | 1536 | 4 |
| 8 | L1-Basic Mode 1 | 16384 | 1024 | 6 |
| 9 | L1-Basic Mode 1 | 16384 | 768 | 8 |
| 10 | L1-Basic Mode 1 | 32768 | 4864 | 3 |
| 11 | L1-Basic Mode 1 | 32768 | 3648 | 3 |
| 12 | L1-Basic Mode 1 | 32768 | 3648 | 8 |
| 13 | L1-Basic Mode 1 | 32768 | 2432 | 6 |
| 14 | L1-Basic Mode 1 | 32768 | 1536 | 8 |
| 15 | L1-Basic Mode 1 | 32768 | 1024 | 12 |
| 16 | L1-Basic Mode 1 | 32768 | 768 | 16 |

TABLE 7

| preamble_structure | L1-Basic Mode | FFT Size | GI Length (samples) | Pilot Pattern (Dx) |
|---|---|---|---|---|
| 17 | L1-Basic Mode 2 | 8192 | 2048 | 3 |
| 18 | L1-Basic Mode 2 | 8182 | 1536 | 4 |
| 19 | L1-Basic Mode 2 | 8192 | 1024 | 3 |
| 20 | L1-Basic Mode 2 | 8192 | 768 | 4 |
| 21 | L1-Basic Mode 2 | 16384 | 4096 | 3 |
| 22 | L1-Basic Mode 2 | 16384 | 3648 | 4 |
| 23 | L1-Basic Mode 2 | 16384 | 2432 | 3 |
| 24 | L1-Basic Mode 2 | 16384 | 1536 | 4 |
| 25 | L1-Basic Mode 2 | 16384 | 1024 | 6 |
| 26 | L1-Basic Mode 2 | 16384 | 768 | 8 |
| 27 | L1-Basic Mode 2 | 32768 | 4864 | 3 |
| 28 | L1-Basic Mode 2 | 32768 | 3648 | 3 |
| 29 | L1-Basic Mode 2 | 32768 | 3648 | 8 |
| 30 | L1-Basic Mode 2 | 32768 | 2432 | 6 |
| 31 | L1-Basic Mode 2 | 32768 | 1536 | 8 |
| 32 | L1-Basic Mode 2 | 32768 | 1024 | 12 |
| 33 | L1-Basic Mode 2 | 32768 | 768 | 16 |

TABLE 8

| preamble_structure | L1-Basic Mode | FFT Size | GI Length (samples) | Pilot Pattern (Dx) |
|---|---|---|---|---|
| 34 | L1-Basic Mode 3 | 8192 | 2048 | 3 |
| 35 | L1-Basic Mode 3 | 8192 | 1536 | 4 |
| 36 | L1-Basic Mode 3 | 8192 | 1024 | 3 |

TABLE 8-continued

| preamble_structure | L1-Basic Mode | FFT Size | GI Length (samples) | Pilot Pattern (Dx) |
|---|---|---|---|---|
| 37 | L1-Basic Mode 3 | 8192 | 768 | 4 |
| 38 | L1-Basic Mode 3 | 16384 | 4096 | 3 |
| 39 | L1-Basic Mode 3 | 16384 | 3648 | 4 |
| 40 | L1-Basic Mode 3 | 16384 | 2432 | 3 |
| 41 | L1-Basic Mode 3 | 16384 | 1536 | 4 |
| 42 | L1-Basic Mode 3 | 16384 | 1024 | 6 |
| 43 | L1-Basic Mode 3 | 16384 | 768 | 8 |
| 44 | L1-Basic Mode 3 | 32768 | 4864 | 3 |
| 45 | L1-Basic Mode 3 | 32768 | 3648 | 3 |
| 46 | L1-Basic Mode 3 | 32768 | 3648 | 8 |
| 47 | L1-Basic Mode 3 | 32768 | 2432 | 6 |
| 48 | L1-Basic Mode 3 | 32768 | 1536 | 8 |
| 49 | L1-Basic Mode 3 | 32768 | 1024 | 12 |
| 50 | L1-Basic Mode 3 | 32768 | 768 | 16 |

TABLE 9

| preamble_structure | L1-Basic Mode | FFT Size | GI Length (samples) | Pilot Pattern (Dx) |
|---|---|---|---|---|
| 51 | L1-Basic Mode 4 | 8192 | 2048 | 3 |
| 52 | L1-Basic Mode 4 | 8192 | 1536 | 4 |
| 53 | L1-Basic Mode 4 | 8192 | 1024 | 3 |
| 54 | L1-Basic Mode 4 | 8192 | 768 | 4 |
| 55 | L1-Basic Mode 4 | 16384 | 4096 | 3 |
| 56 | L1-Basic Mode 4 | 16384 | 3648 | 4 |
| 57 | L1-Basic Mode 4 | 16384 | 2432 | 3 |
| 58 | L1-Basic Mode 4 | 16384 | 1536 | 4 |
| 59 | L1-Basic Mode 4 | 16384 | 1024 | 6 |
| 60 | L1-Basic Mode 4 | 16384 | 768 | 8 |
| 61 | L1-Basic Mode 4 | 32768 | 4864 | 3 |
| 62 | L1-Basic Mode 4 | 32768 | 3648 | 3 |
| 63 | L1-Basic Mode 4 | 32768 | 3648 | 8 |
| 64 | L1-Basic Mode 4 | 32768 | 2432 | 6 |
| 65 | L1-Basic Mode 4 | 32768 | 1536 | 8 |
| 66 | L1-Basic Mode 4 | 32768 | 1024 | 12 |
| 67 | L1-Basic Mode 4 | 32768 | 768 | 16 |

TABLE 10

| preamble_structure | L1-Basic Mode | FFT Size | GI Length (samples) | Pilot Pattern (Dx) |
|---|---|---|---|---|
| 68 | L1-Basic Mode 5 | 8192 | 2048 | 3 |
| 69 | L1-Basic Mode 5 | 8192 | 1536 | 4 |
| 70 | L1-Basic Mode 5 | 8192 | 1024 | 3 |
| 71 | L1-Basic Mode 5 | 8192 | 768 | 4 |
| 72 | L1-Basic Mode 5 | 16384 | 4096 | 3 |
| 73 | L1-Basic Mode 5 | 16384 | 3648 | 4 |
| 74 | L1-Basic Mode 5 | 16384 | 2432 | 3 |
| 75 | L1-Basic Mode 5 | 16384 | 1536 | 4 |
| 76 | L1-Basic Mode 5 | 16384 | 1024 | 6 |
| 77 | L1-Basic Mode 5 | 16384 | 768 | 8 |
| 78 | L1-Basic Mode 5 | 32768 | 4864 | 3 |
| 79 | L1-Basic Mode 5 | 32768 | 3648 | 3 |
| 80 | L1-Basic Mode 5 | 32768 | 3648 | 8 |
| 81 | L1-Basic Mode 5 | 32768 | 2432 | 6 |
| 82 | L1-Basic Mode 5 | 32768 | 1536 | 8 |
| 83 | L1-Basic Mode 5 | 32768 | 1024 | 12 |
| 84 | L1-Basic Mode 5 | 32768 | 768 | 16 |

TABLE 11

| preamble_structure | L1-Basic Mode | FFT Size | GI Length (samples) | Pilot Pattern (Dx) |
|---|---|---|---|---|
| 85 | L1-Basic Mode 6 | 8192 | 2048 | 3 |
| 86 | L1-Basic Mode 6 | 8192 | 1536 | 4 |
| 87 | L1-Basic Mode 6 | 8192 | 1024 | 3 |
| 88 | L1-Basic Mode 6 | 8192 | 768 | 4 |
| 89 | L1-Basic Mode 6 | 16384 | 4096 | 3 |
| 90 | L1-Basic Mode 6 | 16384 | 3648 | 4 |
| 91 | L1-Basic Mode 6 | 16384 | 2432 | 3 |
| 92 | L1-Basic Mode 6 | 16384 | 1536 | 4 |
| 93 | L1-Basic Mode 6 | 16384 | 1024 | 6 |
| 94 | L1-Basic Mode 6 | 16384 | 768 | 8 |
| 95 | L1-Basic Mode 6 | 32768 | 4864 | 3 |
| 96 | L1-Basic Mode 6 | 32768 | 3648 | 3 |
| 97 | L1-Basic Mode 6 | 32768 | 3648 | 8 |
| 98 | L1-Basic Mode 6 | 32768 | 2432 | 6 |
| 99 | L1-Basic Mode 6 | 32768 | 1536 | 8 |
| 100 | L1-Basic Mode 6 | 32768 | 1024 | 12 |
| 101 | L1-Basic Mode 6 | 32768 | 768 | 16 |

TABLE 12

| preamble_structure | L1-Basic Mode | FFT Size | GI Length (samples) | Pilot Pattern (Dx) |
|---|---|---|---|---|
| 102 | L1-Basic Mode 7 | 8192 | 2048 | 3 |
| 103 | L1-Basic Mode 7 | 8192 | 1536 | 4 |
| 104 | L1-Basic Mode 7 | 8192 | 1024 | 3 |
| 105 | L1-Basic Mode 7 | 8192 | 768 | 4 |
| 106 | L1-Basic Mode 7 | 16384 | 4096 | 3 |
| 107 | L1-Basic Mode 7 | 16384 | 3648 | 4 |
| 108 | L1-Basic Mode 7 | 16384 | 2432 | 3 |
| 109 | L1-Basic Mode 7 | 16384 | 1536 | 4 |
| 110 | L1-Basic Mode 7 | 16384 | 1024 | 6 |
| 111 | L1-Basic Mode 7 | 16384 | 768 | 8 |
| 112 | L1-Basic Mode 7 | 32768 | 4864 | 3 |
| 113 | L1-Basic Mode 7 | 32768 | 3648 | 3 |
| 114 | L1-Basic Mode 7 | 32768 | 3648 | 8 |
| 115 | L1-Basic Mode 7 | 32768 | 2432 | 6 |
| 116 | L1-Basic Mode 7 | 32768 | 1546 | 8 |
| 117 | L1-Basic Mode 7 | 32768 | 1024 | 12 |
| 118 | L1-Basic Mode 7 | 32788 | 768 | 16 |

Above Tables 6 to 12 are information on the FFT size of the OFDM symbols constituting the preamble 720, the length of the GI inserted into the preamble 720, and the pattern of the preamble pilot inserted into the preamble 720 for each of the L1 basic mode 1 to 7, and finally a preamble structure value is matched according to the information on the L1 basic mode, the FFT size of the OFDM symbols constituting the preamble 720, the length of the GI inserted into the preamble 720 and the pattern of the preamble pilot inserted into the preamble 720. Furthermore, such a preamble structure value may be included in the bootstrap 710. Specifically, it may be recorded in the signaling field 930 regarding the bootstrap symbol 3 explained with reference to FIG. 9.

Meanwhile, the information on the L1 basic mode includes information for providing certain robustness levels. Such information on the L1 basic mode may be represented as in Table 13 below.

TABLE 13

| Signaling FEC type | | $K_{sig}$ | Code Length | Code Rate | Constellation | Length (Cells) |
|---|---|---|---|---|---|---|
| L1-Basic | Mode 1 | 200 | 16200 | 3/15 | QPSK | 3820 |
| | Mode 2 | | | (Type A) | QPSK | 934 |
| | Mode 3 | | | | QPSK | 484 |
| | Mode 4 | | | | NUC_16_8/15 | 259 |
| | Mode 5 | | | | NUC_64_9/15 | 163 |
| | Mode 6 | | | | NUC_256_9/15 | 112 |
| | Mode 7 | | | | NUC_256_13/15 | 69 |
| L1-detail | Mode 1 | 400~2352 | | | QPSK | |
| | Mode 2 | 400~3072 | | | QPSK | |
| | Mode 3 | 400~6312 | | 6/15 | QPSK | |
| | Mode 4 | | | (Type B) | NUC_16_8/15 | |
| | Mode 5 | | | | NUC_64_9/15 | |
| | Mode 6 | | | | NUC_256_9/15 | |
| | Mode 7 | | | | NUC_256_13/15 | |

As shown in Table 13, the L1 basic mode consists of a total of 7 modes: Mode 1 to Mode 7, according to a Low Density Parity Check (LDPC) code rate, a modulating order and a shortening/puncturing variable. This is to provide various robustness levels that are suitable to a broad signal-to-noise ratio (SNR) area.

Therefore, as shown in Table 6 to Table 12, the bootstrap 710 includes information on Table 5 for each of the seven (7) L1 basic modes: Mode 1 to Mode 7 as shown in Table 13.

Figure 10:
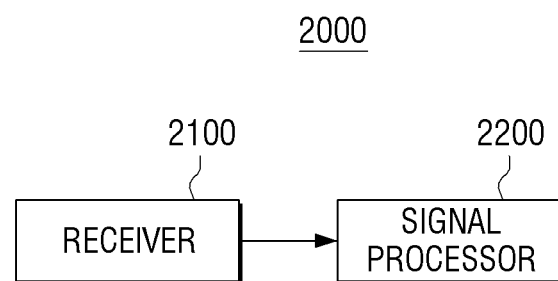
FIG. 10 is a block diagram illustrating a configuration of a receiving apparatus according to an exemplary embodiment.

FIG. 10 is a block diagram illustrating a configuration of a receiving apparatus according to an exemplary embodiment.

Referring to FIG. 10, the receiving apparatus 2000 includes a receiver 2100 and a signal processor 2200.

In this case, the receiver 2000 receives a frame including a plurality of OFDM symbols. Furthermore, the signal processor 220 signal-processes the frame.

In this case, the plurality of OFDM symbols may be divided into a bootstrap, a preamble that includes an L1 basic and an L1 detail, and a payload, which have already been explained with reference to FIG. 7, and thus further explanation is omitted.

Furthermore, the bootstrap includes information on an FFT size of OFDM symbols, a length of a GI inserted into the preamble, a pattern of a preamble pilot inserted into the preamble, and an L1 basic mode. A predetermined GI length value that is greater than the GI length of a first sub frame of a plurality of sub frames included in the payload is determined as the length of the GI inserted into the preamble, and the pattern of the preamble pilot is determined as the pattern of the scattered pilot having the greatest scattered pilot density among patterns of the scattered pilot corresponding to the determined length of the GI. This has already been explained hereinabove, and thus detailed explanation is omitted.

The signal processor 2200 signal-processes the L1 basic based on the information on the FFT size of the OFDM symbols constituting the preamble, the length of the GI inserted into the preamble, the pattern of the preamble pilot inserted into the preamble, and based on the information on the L1 basic mode.

Specifically, the signal processor 2200 may determine in which L1 basic mode to process the L1 basic depending on the information on the L1 basic mode, and may signal-process the L1 basic based on the information on the FFT size of the OFDM symbols constituting the preamble, the length of the GI inserted into the preamble, and on the information on the pattern of the preamble pilot inserted into the preamble corresponding to the determined L1 basic mode.

Especially, the signal processor 2200 may perform channel estimation based on the information on the pattern of the preamble pilot inserted into the preamble.

Figure 11:
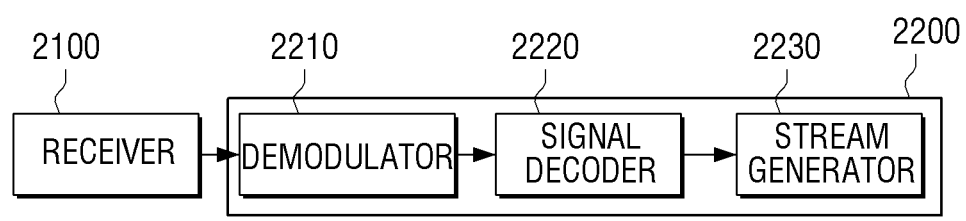
FIG. 11 is a block diagram provided to explain in detail a signal processor according to an exemplary embodiment.

FIG. 11 is a block diagram provided to explain in detail a signal processor according to an exemplary embodiment.

Referring to FIG. 11, the signal processor 2200 includes a demodulator 2210, a decoder 2220 and a stream generator 2230.

The demodulator 2210 performs demodulation according to OFDM parameters from the received RF signals, performs sync-detection, and recognizes whether a currently received frame includes required service data when the sync is detected from signaling information stored in a sync area. For example, the demodulator 831 may recognize whether a mobile frame for a mobile device is received or a fixed frame for a fixed device is received.

In this case, if OFDM parameters are not previously determined regarding a signaling area and a data area, the demodulator 831 may perform demodulation by obtaining OFDM parameters regarding a signaling area and a data area stored in a sync area, and obtaining information about OFDM parameters regarding the signaling area and the data area which are disposed right after the sync area.

The decoder 2220 performs decoding on the service data. In this case, the decoder 2220 may perform decoding by obtaining parameters of an FEC method and a modulation method regarding the data stored in each data area based on the signaling information. Further, the decoder 2220 may calculate positions of the service data based on the data information included in a configurable field and a dynamic field. Thus, it may calculate which positions of the frame a required PLP is transmitted.

The stream generator 2230 may generate the service data to be served by processing a baseband packet input from the decoder 2220.

For example, the stream generator 2230 may generate an ATSC 3.0 Link-layer Protocol (ALP) packet from the baseband packet in which errors are corrected based on an ISSY mode, buffer size (BUFS), time to output (TTO) values and input stream clock reference (ISCR) values.

Specifically, the stream generator 2230 may include de-jitter buffers. The de-jitter buffers may regenerate correct timing to restore an output stream based on the ISSY mode, BUFS, TTO values and ISCR values. Thereby, a delay for sync between a plurality of PLPs can be compensated.

Figure 12:
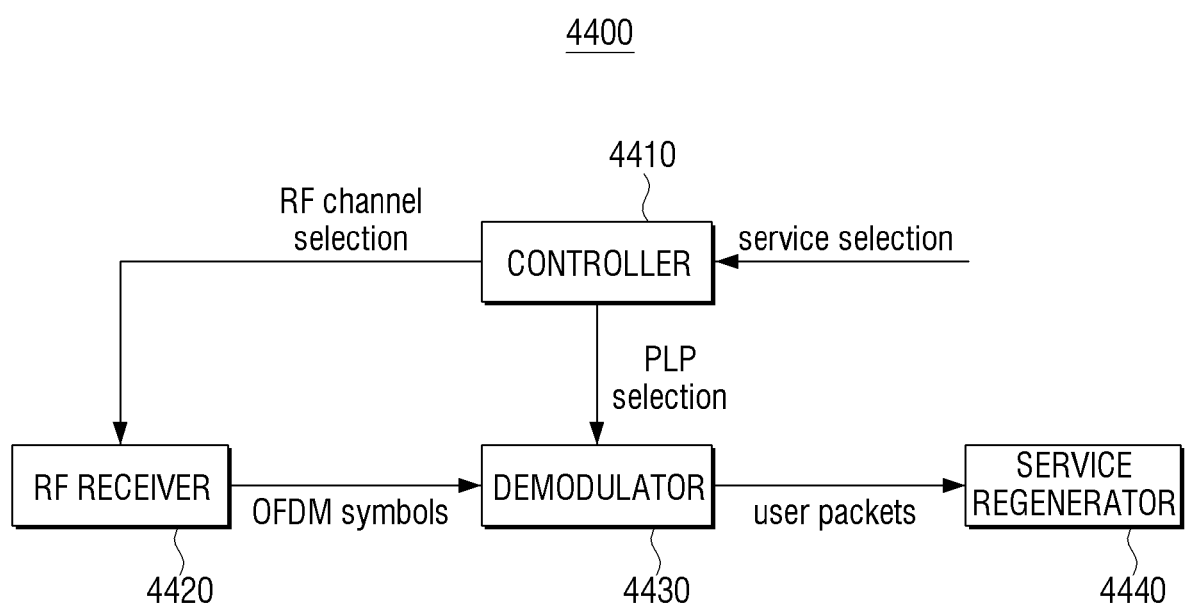
FIG. 12 is a block diagram illustrating a configuration of a receiver according to an exemplary embodiment.

FIG. 12 is a block diagram of a receiving apparatus according to an exemplary embodiment.

Referring to FIG. 12, the receiving apparatus 4400 may include a controller 4410, a radio frequency (RF) receiver 4420, a demodulator 4430, and a service player 4440.

The controller 4410 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service are transmitted through one PLP with one RF channel for convenient explanation. Thus, services are provided with a unique data obtaining path to play services, and the data obtaining path is specified by an RF channel and a PLP.

The RF receiver 4420 extracts RF signals from a selected RF channel by the controller 4410, and delivers OFDM symbols, extracted by performing signal-processing of the RF signals, to the demodulator 4430. The signal processing may include synchronization, channel estimation and equalization. Information required for the signal processing is predetermined between a transmitting apparatus and the receiving apparatus 4400 or transmitted to the receiving apparatus 4400 in a predetermined OFDM symbols among the OFDM symbols.

The demodulator 4430 extracts a user packet by performing signal processing of the OFDM symbols, and delivers to the service player 4440. The service player 4440 plays and outputs the service selected by a user with the user packet. A format of the user packet may be different according to implementing services. For example, a TS packet or an IPv4 packet may be the user packet.

Figure 13:
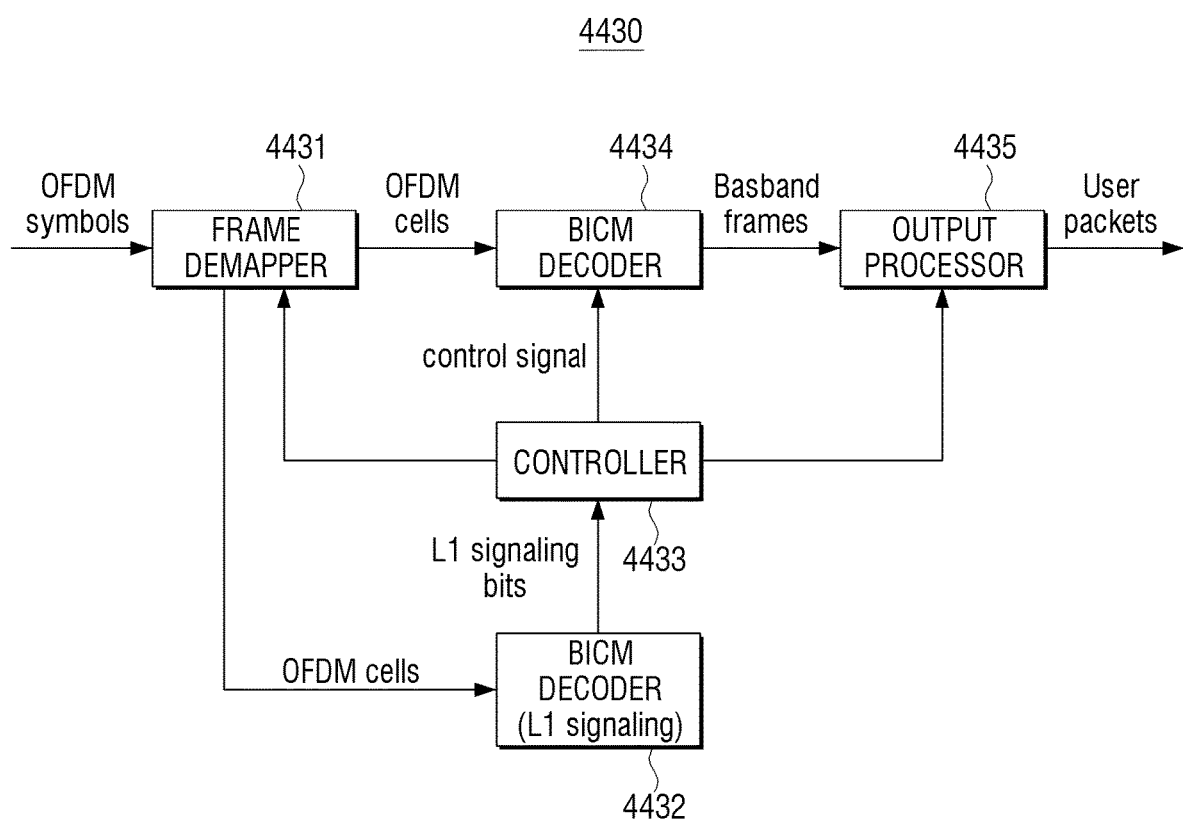
FIG. 13 is a block diagram illustrating in detail a demodulator according to an exemplary embodiment.
Figure 16:
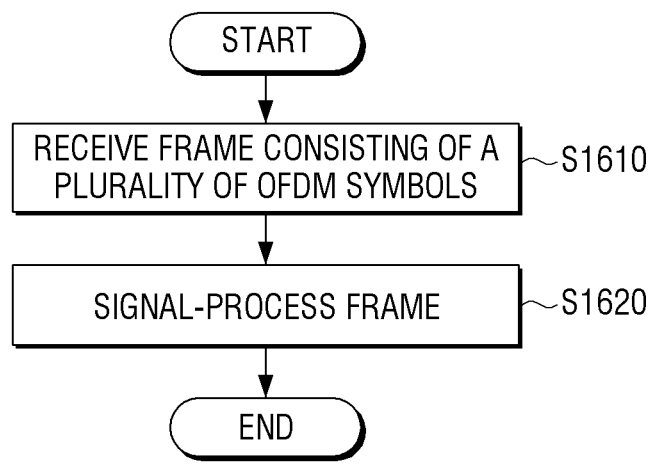
FIG. 16 is a flowchart provided to explain a controlling method of a receiving apparatus according to an exemplary embodiment.

FIG. 13 is a block diagram describing the demodulator of FIG. 16 according to an exemplary embodiment.

Referring to FIG. 13, the demodulator 4430 may include a frame demapper 4431, a BICM decoder 4432 for L1 signaling, a controller 4433, a BICM decoder 4434, and an output processor 4435.

The frame demapper 4431 selects OFDM cells constituting FEC blocks belonging to a selected PLP from a frame constituted with OFDM symbols based on controlling information delivered from the controller 4433, and delivers to the decoder 4434. Further, the frame demapper 4431 selects OFDM cells corresponding to more than one FEC block included in the L1 signaling, and delivers to BICM decoder 4432 for the L1 signaling.

The BICM decoder 4432 for the L1 signaling signal-processes the OFDM cells corresponding to the FEC blocks belonging to the L1 signaling, extracts L1 signaling bits, and delivers to the controller 4433. In this case, the signal processing may include extracting log-likelihood ratio (LLR) values for decoding LDPC codes in OFDM cells, and decoding the LDPC codes by using the extracted LLR values.

The controller 4433 extracts an L1 signaling table from the L1 signaling bits, and controls operations of the frame demapper 4431, the BICM decoder 4434, and the output processor 4435 by using values of the L1 signaling table. FIG. 37 illustrates that the BICM decoder 4432 for the L1 signaling does not use controlling information of the controller 4433 for convenient explanation. However, if the L1 signaling includes a layer structure similar to the L1 pre-signaling and the L1 post-signaling described above, the BICM decoder 4432 for the L1 signaling may be constituted with more than one BICM decoding block, and operations of the BICM decoding blocks and the frame demapper 4431 may be controlled based on upper-layer L1 signaling information, as clearly understood in the above description.

The BICM decoder 4434 signal-processes the OFDM cells constituting FEC blocks belonging to the selected PLP, extracts baseband packets, and delivers the baseband packets to the output processor 4435. The signal processing may include extracting LLR values for coding and decoding LDPC codes in OFDM cells, and decoding the LDPC codes by using the extracted LLR values. These two operations may be performed based on the controlling information delivered from the controller 4433.

The output processor 4435 signal-processes the baseband packets, extracts a user packet, and delivers the extracted user packet to the service player. In this case, the signal processing may be performed on the controlling information delivered from the controller 4433.

Meanwhile, according to an exemplary embodiment, the output processor 1235 may include an ALP packet processor (not illustrated) which extracts an ALP packet from a baseband packet.

Figure 14:
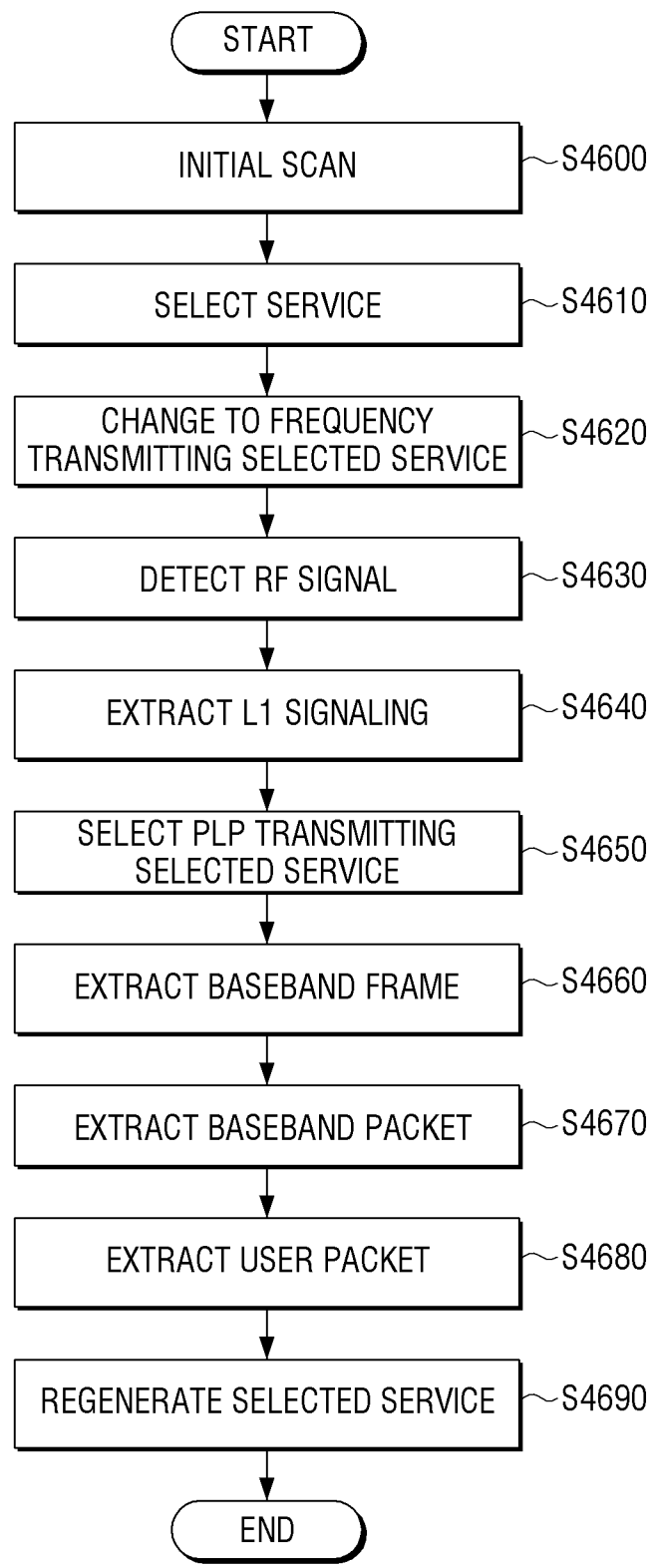
FIG. 14 is a flowchart schematically illustrating an operation of the receiver from the point where a user selects a service until the selected service is actually regenerated according to an exemplary embodiment.

FIG. 14 is a flowchart provided to briefly explain an operation of a receiving apparatus from a time point when a user selects a service to a time point when the selected service is played.

It is assumed that service information about all the services that can be selected at an initial scan process of S4600 is obtained prior to a service select process at S4610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and an upper layer signaling.

When a user selects a service at S4610, the receiving apparatus modifies a frequency transmitting the selected service at S4620, and performs extracting RF signals at S4630. While performing S4620 modifying the frequency transmitting the selected service, the service information may be used.

When the RF signals are extracted, the receiver performs S4640 extracting L1 signaling from the extracted RF signals. The receiving apparatus selects the PLP transmitting the selected service by using the extracted L1 signaling at S4650, and extracts baseband packets from the selected PLP at S4660. At S4650 selecting the PLP transmitting the selected service, the service information may be used.

Further, S4660 extracting the baseband packets may include selecting OFDM cells belonging to the PLP by demapping a transmission frame, extracting LLR values for coding/decoding LDPC, and decoding LDPC codes by using the extracted LLR values.

The receiving apparatus performs S4670 extracting an ALP packet from the extracted baseband packet by using header information about the extracted baseband packet, and performs S4680 extracting a user packet from the extracted ALP packet by using header information about the extracted baseband packet. The extracted user packet is used in S1690 playing the selected service. At S4670 extracting the ALP packet and at S4680 extracting the user packet, L1 signaling information obtained at S4640 extracting the L1 signaling may be used. In this case, a process of extracting the user packet from the ALP packet (restoring null TS packet and inserting a TS sync byte) is the same as described above. According to the exemplary embodiments as described above, various types of data may be mapped to a transmittable physical layer and data processing efficiency may be improved.

Figure 15:
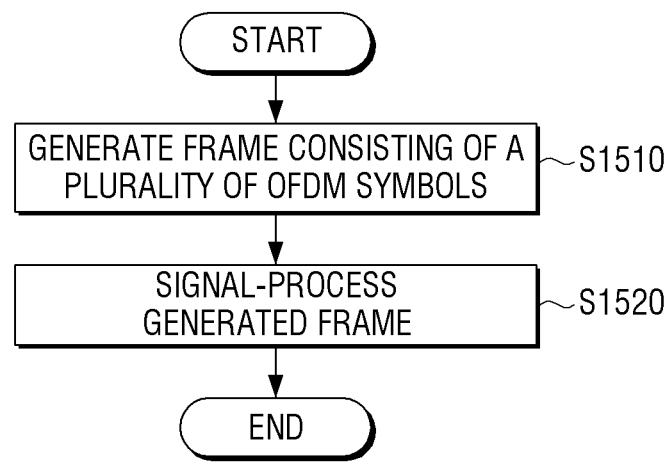
FIG. 15 is a flowchart provided to explain a controlling method of a transmitting apparatus according to an exemplary embodiment.

FIG. 15 is a flowchart provided to explain a controlling method of the transmitting apparatus according to an exemplary embodiment.

The controlling method of the transmitting apparatus illustrated in FIG. 15 generates a frame consisting of a plurality of OFDM symbols (S1510).

Then, the generated frame is signal-processed (S1520).

In this case, the plurality of OFDM symbols may be divided into a bootstrap, a preamble that includes an L1 basic and an L1 detail, and a payload, the bootstrap including information on an FFT size of OFDM symbols constituting the preamble, a length of a GI inserted into the preamble, and a pattern of a preamble pilot inserted into the preamble, and information on an L1 basic mode.

In this case, a predetermined GI length that is the same or greater than a GI length of a first sub frame of a plurality of sub frames included in the payload may be determined as the length of the GI inserted into the preamble, or that is the same or greater than a GI length of a sub frame having the greatest GI length, while a pattern of a scattered pilot corresponding to the determined GI length and having the greatest scattered pilot density may be determined as the pattern of the preamble pilot.

Furthermore, the information on the L1 basic mode includes information for providing certain robustness levels.

Furthermore, the information on the pattern of the preamble pilot includes Dx information on the pattern of the preamble pilot, Dx of the pattern of the scattered pilot being determined as Dx having the greatest density among Dxs of the pattern of the scattered pilot.

Furthermore, Dx of the pattern of the preamble pilot is one of multiples of 3, and multiples of 4, Dx being a carrier index difference between adjacent carriers in which the pilot is inserted.

Furthermore, Dx is one of 3, 4, 6, 8, 12, and 16.

Furthermore, the information on the pattern of the preamble pilot includes Dy information on the pattern of the preamble pilot, the Dy being 1.

Furthermore, the pattern of the scattered pilot is represented as shown in above Table 4 according to the length of the GI inserted into the payload and the FFT size of the OFDM symbols constituting the payload.

Furthermore, a table where there is recorded information on the FFT size of the OFDM symbols constituting the preamble, the length of the GI inserted into the preamble, and the pattern of the preamble pilot inserted into the preamble is represented as shown in above Table 6.

FIG. 16 is a flowchart provided to explain a controlling method of the receiving apparatus according to an exemplary embodiment.

The controlling method of the receiving apparatus illustrated in FIG. 16 receives a frame consisting of a plurality of OFDM symbols (S1610).

Then, the frame is signal-processed (S1620).

In this case, the plurality of OFDM symbols may be divided into a bootstrap, a preamble that includes an L1 basic and an L1 detail, and a payload.

Furthermore, the bootstrap includes information on an FFT size of the OFDM symbols constituting the preamble, a length of a GI inserted into the preamble, a pattern of a preamble pilot inserted into the preamble, and information on an L1 basic mode.

Furthermore, a predetermined GI length that is the same or greater than a GI length of a first sub frame of a plurality of sub frames included in the payload, or that is the same or greater than a GI length of a sub frame having the greatest GI length among the plurality of sub frames is determined as the length of the GI inserted into the preamble; and a pattern of a scattered pilot corresponding to the determined GI length and having the greatest density is determined as the pattern of the preamble pilot.

Furthermore, a non-transitory computer readable medium may be provided that stores a program configured to sequentially perform the signal processing method of the inventive concept described above.

The non-transitory computer readable medium refers to a computer readable medium that is configured to store data semi-permanently and not for a short period of time such as a register, cache, memory and the like. More specifically, the various aforementioned applications or programs may be stored in and provided through a non-transitory computer readable medium such as a CD, a DVD, a hard disc, a blue-ray disc, a USB, a memory card, a ROM and the like.

At least one of the components, elements, modules or units represented by a block as illustrated in FIGS. 2-6, 8 and 10-13 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing embodiments and advantages are merely exemplary and are not to be construed as limiting the inventive concept. The present teaching can be readily applied to other types of apparatuses. Also, the description of the exemplary embodiments of the inventive concept is intended to be illustrative, and not to limit the scope of the claims, and many alternatives, modifications, and variations will be apparent to those skilled in the art.

What is claimed is:

1. A transmitting method of transmitting apparatus, the method comprising:
generating a frame comprising a plurality of Orthogonal Frequency-Division Multiplexing (OFDM) symbols;
inserting one or more pilots into the frame; and
inserting one or more guard intervals (GIs) into the frame;
transmitting a signal which is generated based on the frame,
wherein the generated frame comprises a bootstrap, a preamble and a payload,
wherein the payload comprises one or more subframes,
wherein a length of a guard interval (GI) inserted in the preamble is equal to a length of a GI inserted in a first subframe from among the one or more subframes, and
wherein a pilot density in the preamble is determined according to the length of the GI inserted in the preamble, the pilot density of the preamble being equal or greater than a pilot density in the first subframe.

2. The method according to claim 1, wherein the bootstrap comprises information on a Fast Fourier Transform (FFT) size of the one or more subframes, the length of the GI inserted in the preamble, and a pattern of a preamble pilot inserted in the preamble and an L1 basic mode, and wherein the information on the L1 basic mode comprises information for providing certain robustness levels.

3. The method according to claim 2, wherein the information on the pattern of the preamble pilot comprises Dx information on the pattern of the preamble pilot, and
wherein a Dx of the pattern of a scattered pilot is determined as a Dx having the greatest density among Dxs of the pattern of the scattered pilot.

4. The method according to claim 3, wherein the Dx of the pattern of the preamble pilot is one of multiples of 3 and multiples of 4, and
wherein the Dx is a carrier index difference between adjacent carriers in which the preamble pilot or the scattered pilot is inserted.

5. The method according to claim 4, wherein the Dx is one of 3, 4, 6, 8, 12, and 16.

6. The method according to claim 2, wherein the information on the pattern of the preamble pilot comprises Dy information on the pattern of the preamble pilot, and
wherein the Dy is 1.

7. The method according to claim 2, wherein the pattern of a scattered pilot is represented as shown in a table below according to the length of the GI inserted in the payload and the FFT size of the one or more subframes included in the payload

| GI Pattern | Samples | 8K FFT | 16K FFT | 32K FFT |
|---|---|---|---|---|
| GI1_192 | 192 | SP32_2, SP32_4 SP16_2, SP16_4 | SP32_2, SP32_4 | SP32_2 |
| GI2_384 | 384 | SP16_2, SP16_4 SP8_2, SP8_4 | SP32_2, SP32_4 SP16_2, SP16_4 | SP32_2 |
| GI3_512 | 512 | SP12_2, SP12_4 SP6_2, SP6_4 | SP24_2, SP24_4 SP12_2, SP12_4 | SP24_2 |
| GI4_768 | 768 | SP8_2, SP8_4 SP4_2, SP4_4 | SP16_2, SP16_4 SP8_2, SP8_4 | SP32_2, SP16_2 |
| GI5_1024 | 1024 | SP6_2, SP6_4 SP3_2, SP3_4 | SP12_2, SP12_4 SP6_2, SP6_4 | SP24_2, SP12_2 |
| GI6_1535 | 1536 | SP4_2, SP4_4 | SP8_2, SP8_4 SP4_2, SP4_4 | SP16_2, SP8_2 |
| GI6_2048 | 2048 | SP3_2, SP3_4 | SP6_2, SP6_4 SP3_2, SP3_4 | SP12_2, SP6_2 |
| GI6_2432 | 2432 | N/A | SP6_2, SP6_4 SP3_2, SP3_4 | SP12_2, SP6_2 |
| GI6_3072 | 3072 | N/A | SP4_2, SP4_4 | SP8_2, SP3_2 |
| GI6_3648 | 3648 | N/A | SP4_2, SP4_4 | SP8_2, SP3_2 |
| GI6_4096 | 4096 | N/A | SP3_2, SP3_4 | SP6_2, SP3_2 |
| GI6_4864 | 4864 | N/A | N/A | SP6_2, SP3_2. |

8. The method according to claim 2, wherein the information on the FFT size of the one or more subframes included in the preamble, the length of the GI inserted in the preamble, and the pattern of the preamble pilot inserted in the preamble is represented as shown in a table below

| FFT Size | GI Length (samples) | Pilot Pattern (Dx) |
|---|---|---|
| 8192 | 2048 | 3 |
| 8192 | 1536 | 4 |
| 8192 | 1024 | 3 |
| 8192 | 768 | 4 |
| 16384 | 4096 | 3 |
| 16384 | 3648 | 4 |
| 16384 | 2432 | 3 |
| 16384 | 1536 | 4 |
| 16384 | 1024 | 6 |
| 16384 | 768 | 8 |
| 32768 | 4864 | 3 |
| 32768 | 3648 | 3 |
| 32788 | 3648 | 8 |
| 32768 | 2432 | 6 |
| 32768 | 1536 | 8 |
| 32768 | 1024 | 12 |
| 32768 | 768 | 16. |

9. The method according to claim 1, wherein a pattern of a pilot inserted in the preamble is obtained based on the length of the GI inserted in the preamble and a Fast Fourier Transform (FFT) size of the one or more subframes.

* * * * *